United States Patent
Kennedy et al.

(10) Patent No.: US 10,811,867 B2
(45) Date of Patent: Oct. 20, 2020

(54) HYBRID AIR-GAP / SOLID-STATE CIRCUIT BREAKER

(71) Applicant: Atom Power, Inc., Charlotte, NC (US)

(72) Inventors: Ryan Kennedy, Cornelius, NC (US); Denis Kouroussis, Markham (CA)

(73) Assignee: Atom Power, Inc., Charlotte, NC (US)

( * ) Notice: Subject to any disclaimer, the term of this patent is extended or adjusted under 35 U.S.C. 154(b) by 0 days.

(21) Appl. No.: 16/683,774

(22) Filed: Nov. 14, 2019

(65) Prior Publication Data

US 2020/0083699 A1 Mar. 12, 2020

Related U.S. Application Data

(63) Continuation of application No. 15/443,736, filed on Feb. 27, 2017, now Pat. No. 10,541,530.
(Continued)

(51) Int. Cl.
*H02H 7/08* (2006.01)
*H02H 7/085* (2006.01)
(Continued)

(52) U.S. Cl.
CPC .......... *H02H 7/0833* (2013.01); *H01H 9/548* (2013.01); *H01H 71/123* (2013.01);
(Continued)

(58) Field of Classification Search
CPC .......... H02H 7/0833; H02H 3/08; H02H 3/20; H02H 3/382; H02H 3/42; H02H 7/0855;
(Continued)

(56) References Cited

U.S. PATENT DOCUMENTS

| 4,644,438 A | 2/1987 | Puccinelli et al. |
| 5,638,038 A * | 6/1997 | Suzuki ............ H01H 9/542 335/35 |

(Continued)

FOREIGN PATENT DOCUMENTS

| CN | 137593 A | 10/2002 |
| EP | 3041101 A1 | 7/2016 |

OTHER PUBLICATIONS

European Patent Office (EPO), Extended European Search Report, European Patent Appl. No. 17760556.5.

*Primary Examiner* — Bernard Rojas
(74) *Attorney, Agent, or Firm* — Patent Law Professionals, P.C.; William E. Winters

(57) ABSTRACT

A hybrid air-gap/solid-state device protection device (PD) for use in an electrical power distribution system includes an air-gap disconnect unit connected in series with a solid-state device, a sense and drive circuit, and a microcontroller. Upon the sense and drive circuit detecting an impending fault or exceedingly high and unacceptable overvoltage condition in the PD's load circuit, the sense and drive circuit generates a gating signal that quickly switches the solid-state device OFF. Meanwhile, the microcontroller generates a disconnect pulse for the air-gap disconnect unit, which responds by forming an air gap in the load circuit. Together, the switched-OFF solid-state device and air gap protect the load and associated load circuit from being damaged. They also serve to electrically and physically isolate the source of the fault or overload condition from the remainder of the electrical power distribution system.

48 Claims, 15 Drawing Sheets

Related U.S. Application Data

(60) Provisional application No. 62/301,948, filed on Mar. 1, 2016.

(51) Int. Cl.
   *H02H 3/20* (2006.01)
   *H02H 7/22* (2006.01)
   *H02H 3/38* (2006.01)
   *H02H 3/08* (2006.01)
   *H02H 3/42* (2006.01)
   *H01H 71/12* (2006.01)
   *H01H 9/54* (2006.01)
   *H02P 1/26* (2006.01)
   *H01H 71/10* (2006.01)

(52) U.S. Cl.
   CPC ............... *H02H 3/08* (2013.01); *H02H 3/20* (2013.01); *H02H 3/382* (2013.01); *H02H 3/42* (2013.01); *H02H 7/0855* (2013.01); *H02H 7/0856* (2013.01); *H02H 7/222* (2013.01); *H02P 1/26* (2013.01); *H01H 71/1081* (2013.01)

(58) Field of Classification Search
   CPC ...... H02H 7/0856; H02H 7/222; H01H 9/548; H01H 71/123; H01H 71/1081; H02P 1/26
   See application file for complete search history.

(56) References Cited

U.S. PATENT DOCUMENTS

| | | |
|---|---|---|
| 6,008,971 A | 12/1999 | Duba et al. |
| 8,861,162 B2 | 10/2014 | Fuller et al. |
| 10,134,551 B2 * | 11/2018 | Potter .................. H01H 47/007 |
| 2001/0026185 A1 * | 10/2001 | Sher ..................... H01L 23/525 |
| | | 327/525 |
| 2007/0121257 A1 | 5/2007 | Maitra et al. |
| 2009/0290275 A1 | 11/2009 | Staszesky et al. |
| 2011/0080677 A1 * | 4/2011 | Radosavljevic ....... H01H 71/20 |
| | | 361/42 |
| 2013/0027829 A1 | 1/2013 | Antoniazzi et al. |
| 2016/0243951 A1 * | 8/2016 | Pritelli ................. H05K 7/1422 |

* cited by examiner

HYBRID AIR-GAP / SOLID-STATE CIRCUIT BREAKER

CROSS-REFERENCE TO RELATED APPLICATIONS

This application is a continuation of U.S. patent application Ser. No. 15/443,736, filed Feb. 27, 2017, and claims the benefit of U.S. Provisional Patent Application No. 62/301,948, filed Mar. 1, 2016.

BACKGROUND OF THE INVENTION

Electrical circuit breakers are used in electrical distribution systems to protect electrical loads and conductors from being exposed to overcurrent conditions. In general, there are two types of overcurrent conditions—an overload and a fault. The National Electrical Code (NEC) defines an overload as: "operation of equipment in excess of normal, full-load rating, or conductor in excess of rated ampacity that when it persists for a sufficient length of time, would cause damage or dangerous overheating." Faults typically produce much higher overcurrents than do overloads, depending on the fault impedance. A fault with no impedance is referred to as a "short circuit" or as a "bolted fault."

Conventional circuit breakers are mechanical in nature. They have electrical contacts that are physically separated upon the occurrence of a fault or prolonged overcurrent condition. Opening the contacts is normally performed electromagnetically, using a spring mechanism, compressed air, or a combination of a spring mechanism and compressed air.

One significant problem with conventional circuit breakers is that they are slow to react to faults. Due to their electromechanical construction, conventional circuit breakers will typically require at least several milliseconds to isolate a fault. The slow reaction time is undesirable since it raises the risk of fire hazards, damage to electrical equipment, and even arc flashes, which can occur when a short circuit or bolted fault is not isolated quickly enough. An arc flash is an electrical explosion of the electrical conductors that create the short-circuit condition. The energy released in an arc flash can produce temperatures exceeding 35,000° F. (or 20,000° C.) at the arc terminals, resulting in rapidly vaporizing metal conductors, blasting molten metal, as well as expanding plasma that is ejected outwards from the point of incident with extreme force. Arc flashes are therefore clearly extremely hazardous to life, property and electrical equipment.

In addition to being slow at isolating faults, conventional circuit breakers are highly variable. Due to limitations on the magnetics and mechanical design involved, the time it takes, and the current limit at which, a mechanical circuit breaker trips in response to a fault or prolonged overcurrent condition can vary in a single given circuit breaker and can also vary from one circuit breaker to another, even for circuit breakers that are of the same type and same rating, and even of the same type and rating from the same manufacturer.

Due to the lack of precision and high degree of variability of conventional circuit breakers, manufacturers will typically provide time-current characteristic data for each type and rating of circuit breaker that they manufacture and sell. The time-current characteristic data for a particular type and rating is often displayed in a two-dimensional logarithmic plot, such as illustrated in FIG. 1, with current on the horizontal axis, time on the vertical axis, time-current regions in which the circuit breaker is guaranteed to trip and not trip, and uncertainty bands within which the trip status of the breaker is uncertain.

The lack of precision and high degree of variability of conventional circuit breakers make coordination studies difficult to perform. A coordination study is a study performed by an electrician or engineer during the design of an electrical distribution system. The coordination study involves selecting circuit breakers, often of different ratings, and figuring out the best way to arrange the various selected circuit breakers in the electrical distribution system. One important task involved in the coordination study involves configuring the various circuit breakers in such a way that only the closest circuit breaker upstream from an impending fault will trip to electrically isolate the impending fault. If this task is properly performed, the time-current uncertainty bands of the various circuit breakers will not overlap. Unfortunately, due to the lack of precision and the resulting uncertainty bands in the time-current characteristics, the coordination study cannot always be completed as required or desired, and the uncertainty bands of the various circuit breakers end up overlapping to some extent, as illustrated in FIG. 2. The overlapping uncertainty bands is problematic since it results in the possibility that upstream circuit breakers will trip prematurely or unnecessarily in response to an impending fault, instead of by a circuit breaker located further downstream that is closer to the impending fault. The premature or unnecessary tripping of the upstream circuit breaker is undesirable since it can result in a larger section of the distribution system being de-energized than is necessary.

Conventional circuit breakers provide high isolation capability, once they have been tripped. However, their slow reaction times, lack of precision, and high degree of variability are all undesirable characteristics. Not only do the slow reaction times result in inadequate protection against the possibility of arc flashes, the high degree of variability and lack of precision make coordination studies difficult, and in some cases even impossible, to perform. It would be desirable, therefore, to have a circuit breaker that has the high isolation capability offered by conventional electromechanical circuit breakers but which also has the ability to react to and isolate faults and other overcurrent conditions much more rapidly than conventional electromechanical circuit breakers are capable of. It would also be desirable to have a fast-reacting circuit breaker that has time-current characteristics that are precise and which can be programmed, even dynamically and in real time, with a high degree of precision.

BRIEF SUMMARY OF THE INVENTION

A hybrid air-gap/solid-state device protection device (PD) for use in an electrical power distribution system is disclosed. The hybrid air-gap/solid-state PD includes an air-gap disconnect unit connected in series with a solid-state device, a sense and drive circuit, and a microcontroller. Upon the sense and drive circuit detecting an impending fault or exceedingly high and unacceptable overvoltage condition in the PD's load circuit, the sense and drive circuit generates a gating signal that quickly switches the solid-state device OFF. Meanwhile, the microcontroller generates a disconnect pulse for the air-gap disconnect unit, which responds by forming an air gap in the load circuit. Together, the switched-OFF solid-state device and air gap protect the load and associated load circuit from being damaged and also serve to electrically and physically isolate the source of the fault or overload condition from the remainder of the electrical power distribution system. The advantage of employing the solid-state device is that impending faults can be reacted to in a matter of microseconds. The air gap formed by the air-gap disconnect unit isolates the fault even if the solid-state device fails to switch OFF or malfunctions, ensuring that the PD complies with electrical codes, regulations and certification requirements.

Further features and advantages of the invention, including a detailed description of the above-summarized and other exemplary embodiments of the invention, will now be described in detail with respect to the accompanying drawings, in which like reference numbers are used to indicate identical or functionally similar elements.

DETAILED DESCRIPTION

Figure 3:
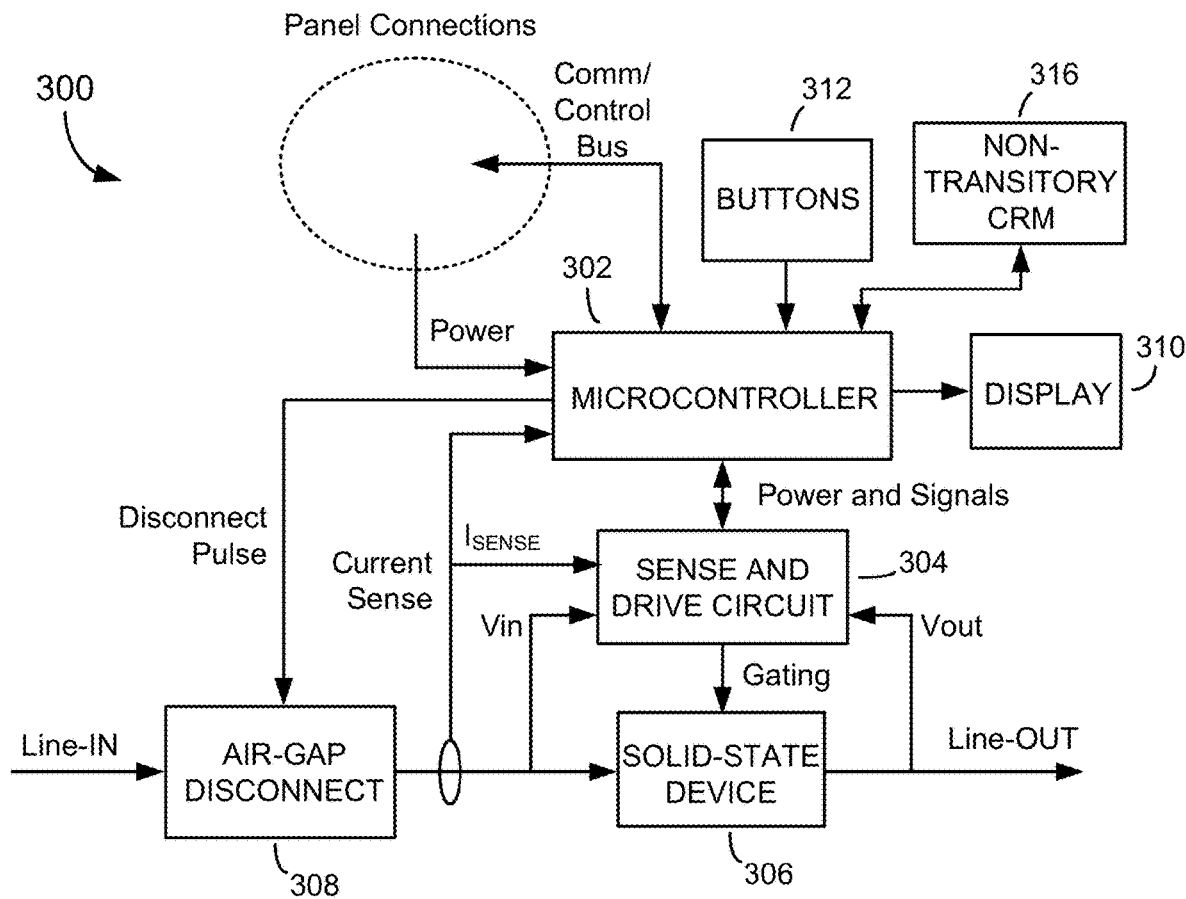
FIG. 3 is a block diagram highlighting the salient components of a hybrid air-gap/solid-state circuit breaker (i.e., protection device or "PD"), according to one embodiment of the present invention.

Referring to FIG. 3, there is shown a drawing depicting a hybrid air-gap/solid-state circuit breaker 300 (also referred to as a "protection device" or "PD" in the detailed description below), according to one embodiment of the present invention. The PD 300 comprises a microcontroller 302; a sense and drive circuit 304; a solid-state device 306; and an air-gap disconnect unit 308. The microcontroller 302, sense and drive circuit 304, and other components of the PD 300 are powered by a direct current (DC) power supplied by one or more local DC power supplies independent of the electrical distribution system in which the PD 300 is configured or from an alternating current (AC) to DC power converter that produces DC power from an AC power source in the electrical distribution system. The solid-state device 306 comprises an electrically controlled solid-state device (or device(s)), such as an insulated gate bipolar junction transistor (IGBT), power metal-oxide-semiconductor field effect transistor (MOSFET), thyristor, silicon-controlled rectifier (SCR), triode for alternating current (TRIAC), or any other suitable high-power, controlled solid-state device. The solid-state device 306 is connected in series with the air-gap disconnect unit 308, so that when the PD 300 is deployed in an electrical distribution system the solid-state device 306 and air-gap disconnect unit 308 are connected in series between a line input (Line-IN) terminal and a line output (Line-OUT) terminal, to which a load is connected.

Figure 4:
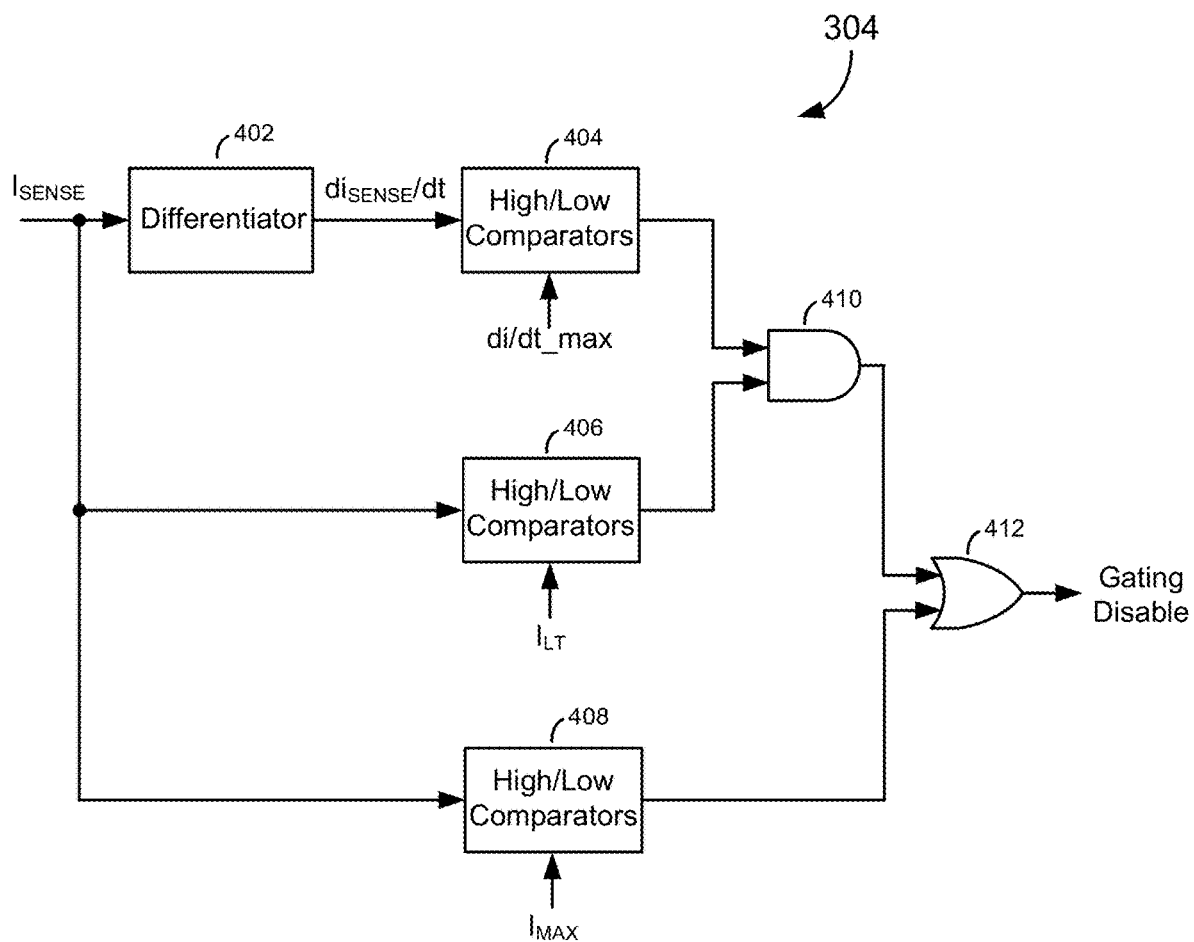
FIG. 4 is a drawing depicting one way that the sense and drive circuit of the hybrid air-gap/solid-state circuit breaker depicted in FIG. 3 can be implemented.

The sense and drive circuit 304 is configured to continuously monitor a sense current $I_{SENSE}$ representative of the current being drawn through the Line-IN terminal, and produces a gating signal which controls whether the solid-state device 306 is ON, in which case current from the line Line-IN terminal is allowed to flow to a load the PD 300 is serving to protect, or is OFF to electrically isolate the load from the Line-IN terminal. FIG. 4 is a drawing illustrating one way that the short circuit detection part of the sense and drive circuit 304 can be implemented. As will become clear from the description that follows, the sense and drive circuit 304 has the ability to determine whether a sudden increase in current being drawn from the Line-IN terminal is due to a load being brought online or is due to an impending fault. It is also capable of distinguishing between resistive and inductive loads and determining whether a sudden increase in current corresponds to an inrush current being drawn by an inductive load when being brought online or is the result of an impending fault.

As shown in FIG. 4, the exemplary sense and drive circuit 304 includes a differentiator 402; first, second and third high/low comparators 404, 406, 408; an AND logic gate 410; and an OR gate 412. The differentiator 402 operates to differentiate the sense current $I_{SENSE}$ and produce a differentiated sense current $di_{SENSE}/dt$ indicative of the rate of change of the sense current $I_{SENSE}$. Because the sense current $I_{SENSE}$ is AC, with positive and negative half cycles, and a sudden increase in current being drawn from the Line-IN terminal can possibly occur during either positive or negative half cycles of the sense current $I_{SENSE}$, the differentiated sense current $di_{SENSE}/dt$ produced by the differentiator 402 provides an indication of the rate of change of the sense current $I_{SENSE}$ during both positive and negative half cycles.

The first and second high/low comparators 404 and 406 and AND logic gate 410 serve to determine whether a sudden increase in current drawn from the Line-IN terminal is due to an impending fault or is due to a resistive load being brought online (or being "turned on"). This ability to distinguish between an impending fault and a resistive load being online is important since it prevents the PD 300 from tripping unnecessarily or prematurely in the event that the sudden increase in current is due to a resistive load being brought online and not due to an impending fault. To accomplish this task the first high/low comparator 404 compares the differentiated sense current $di_{SENSE}/dt$ to a predetermined maximum rate of change in current $di/dt\_max$. In the event that the differentiated sense current $di_{SENSE}/dt$ exceeds the maximum rate of change in current $di/dt\_max$ the first high/low comparator 404 produces a logic HIGH output. The logic HIGH output provides an indication that a fault may be developing in the load circuit. On the other hand, so long as the differentiated sense current $di_{SENSE}/dt$ remains less than the maximum rate of change in current $di/dt\_max$, the first high/low comparator 404 produces a logic LOW output.

When a resistive load is being brought online, the current that it draws from the Line-IN terminal will be step-like. However, an impending fault will also produce a step-like change in current. Since $di_{SENSE}/dt$ is high in both cases, a $di_{SENSE}/dt$ that exceeds $di/dt\_max$ is not by itself sufficient to conclude with absolute certainty that a fault is developing in the load circuit. However, one significant difference between developing fault and the turn-on transient of a resistive load is that once the turn-on transient of the resistive load has completed, which will happen very quickly, the magnitude of current that the resistive load draws will level off to some finite value (the specific value depending on the resistance of the load). On the other hand, when a fault is developing, the magnitude of current being drawn from the line will rise to a much higher magnitude, limited only by the ability of the line to deliver current to the fault. The sense and drive circuit 304 exploits this difference to detect and determine whether a resistive load is being brought online or a fault is developing. Specifically, the second high/low comparator 406 compares the magnitude of the sense current $I_{SENSE}$ to the magnitude of a "long-time trip threshold current" $I_{LT}$. If the current being drawn from the line, as represented by the sense current $I_{SENSE}$, rises to a value greater than the long-time trip threshold current $I_{LT}$, the second high/low comparator 406 produces a logic HIGH output. Accordingly, in a situation where both $di_{SENSE}/dt$ exceeds $di/dt\_max$ AND the current being drawn from the line, as represented by the sense current $I_{SENSE}$, exceeds the long-time trip threshold current $I_{LT}$, the AND logic gate 410 will generate a logic HIGH output. The logic HIGH output indicates that a fault is developing in the load circuit or that an exceedingly high and unacceptable overload condition is present or developing. Accordingly, once the AND logic gate 410 produces the logic HIGH output, and the logic HIGH output passes through the OR gate 412, a gating disable logic is produced at the output, commanding the remaining circuitry of the sense and drive circuit 304 to switch the solid-state device 306 OFF in order to electrically isolate the load from the impending fault or overload condition. On the other hand, if either $di_{SENSE}/dt$ remains below $di/dt\_max$ or the current being drawn from the line, as represented by the sense current $I_{SENSE}$, remains below the long-time trip threshold current $I_{LT}$, the AND logic gate 410 produces a logic LOW output and the solid-state device 306 remains ON. In this manner, even if $di_{SENSE}/dt$ exceeds $di/dt\_max$ as the resistive load is being brought on line, the resistive load will still be allowed to be brought online so long as the maximum current it draws does not result in the sense current $I_{SENSE}$ exceeding the long-time trip threshold current $I_{LT}$.

The third high/low comparator 408 serves to continuously compare the incoming sense current $I_{SENSE}$ to an "instant-trip threshold current" $I_{MAX}$. The instant-trip threshold current $I_{MAX}$ is the absolute maximum current that the PD 300 will allow to flow to the load under any circumstance. If the current drawn by the load, as represented by the sense current $I_{SENSE}$, exceeds the instant-trip threshold current $I_{MAX}$, the third high/low comparator 408 will produce a logic HIGH output, which after propagating through the OR logic gate 412 will instantly command the turn OFF of the solid-state device 306. The time it takes for the solid-state device 306 to turn OFF is limited only by the time (propagation delay) it takes the sense and drive circuit logic to generate the logic HIGH output, the time of disabling the gate driving circuitry and the reaction time it takes the solid-state device 306 to change state. The word "instant" is used here to indicate that this time will be on the order of a few microseconds or even less.

The sense and drive circuit 304 is further capable of distinguishing between resistive and inductive loads and protecting against exceedingly high inrush currents, which occur when an inductive load, such as an induction motor, is being brought online. An inductive load will result in a smaller $di_{SENSE}/dt$ when being brought online than the near step-like $di_{SENSE}/dt$ that results when a resistive load being brought online and under normal operating conditions will remain less than $di/dt\_max$. Accordingly, so long as $di_{SENSE}/dt$ remains less than $di/dt\_max$ and the sense current $I_{SENSE}$ remains below the instant-trip threshold current $I_{MAX}$ during an inrush event, the output of the OR logic gate 412 will remain at a logic LOW as the inductive load is being brought online. However, if the inrush current ever exceeds the instant-trip threshold current $I_{MAX}$ during the inrush event, the third high/low comparator 408 will produce a logic HIGH output, which after propagating through the OR logic gate 412 will command the solid-state device 306 to turn OFF.

In a preferred embodiment of the invention the various functions performed by the sense and drive circuit 304 are implemented in hardware (as depicted and described above in reference to FIG. 4). A hardware implementation is preferred since it provides the fastest way to detect and respond to impending faults. In the sense and drive circuit 304 described above, detecting and responding to an impending fault can be completed in a matter of microseconds or even less. While a hardware approach is preferred due to its fast reaction capability, a 'software' approach could be used instead, or some of the various functions performed by the sense and drive circuit 304 could be software-controlled. In a software-controlled implementation the microcontroller 302 would be programmed and configured detect and respond to impending faults, distinguish between loads being brought online and impending faults, and generate the gating signal that directs the solid-state device 306 to switch OFF when conditions warrant. Alternatively, these various functions could be performed partly by the sense and drive circuit 304 hardware and partly by the microcontroller 302.

In one embodiment of the invention the sense current $I_{SENSE}$ is not only directed to the sense and drive circuit 304 but also to the microcontroller 302 in the PD 300 (see FIG. 3). The input and output voltages Vin and Vout at the input and output of the solid-state device 306 may also be directed to the microcontroller 302, after being reduced to lower voltages (for example, using voltage dividers). Using the received line current and voltage information, the microcontroller 302 can then generate real-time operating data, which can be displayed on a display 310, such as, for example, the amount of real-time current being drawn by the load. Using the real-time current and voltage information, the microcontroller 302 can also perform diagnostic checks concerning the operational status and performance of the solid-state device 306 and/or direct the sense and drive circuit 304 to turn the solid-state device 306 OFF when conditions warrant. It should be pointed out that real-time current information (and, possibly, real-time line voltage information) is sent to the microcontroller 302, irrespective of the operational status of the solid-state device 306. Accordingly, should the solid-state device 306 ever fail, the air-gap disconnect unit 308 can still be activated in the event of a fault, in which circumstance the air-gap disconnect unit 308, which will be described in more detail below, serves as a "fail-safe."

In one embodiment of the invention the microcontroller 302 in the PD 300 includes one or more input/output ports for connecting to a communications/control (comm/control) bus. Providing the ability of the microcontroller 302 to communicate over the comm/control bus allows the microcontroller 302 to report information, such as, for example, operational status, diagnostic information, current data, load information, PD identification information, etc. associated with the PD 300 to another computing device that is also connected to the comm/control bus.

Employing the solid-state device 306 and controlling it using the rapid-response sense and drive circuit 304 allows the PD 300 to detect and respond to impending faults and other electrical hazards much more rapidly than is possible using a conventional electromechanical circuit breaker. Solid-state devices designed for electrical power applications have the ability to change states (i.e., can be turned ON and OFF) in a matter of microseconds and, in some cases, even in a matter of nanoseconds. Accordingly, by employing the solid-state device 306 and controlling it using the rapid-response sense and drive circuit 304, the PD 300 is able to isolate a fault over a thousand times more rapidly than is possible using a conventional electromechanical circuit breaker, which as explained in the Background of the Invention above, typically takes several milliseconds to respond to and isolate a fault.

Figure 1:
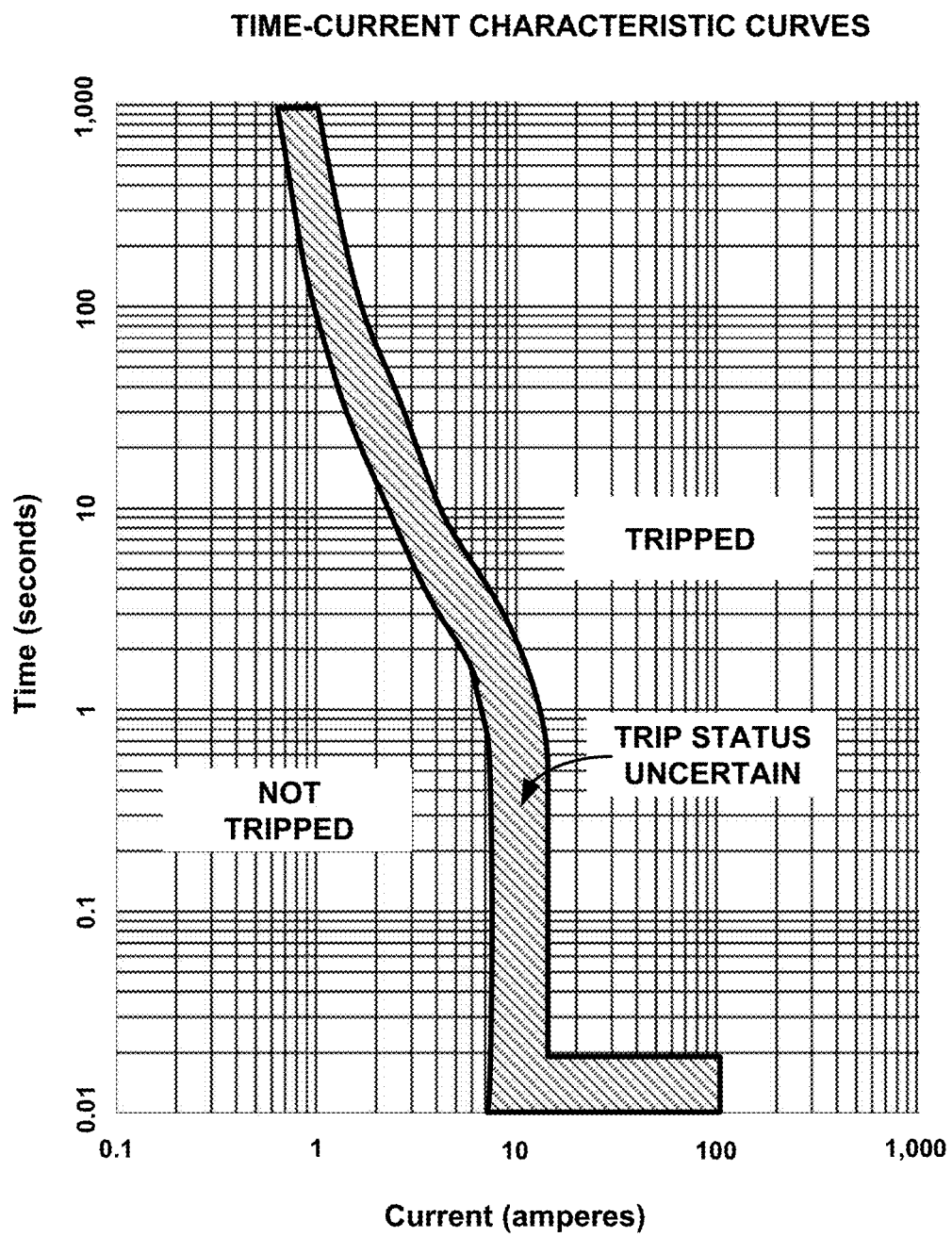
FIG. 1 is a graph of a time-current uncertainty band associated with a conventional electromechanical circuit breaker.
Figure 2:
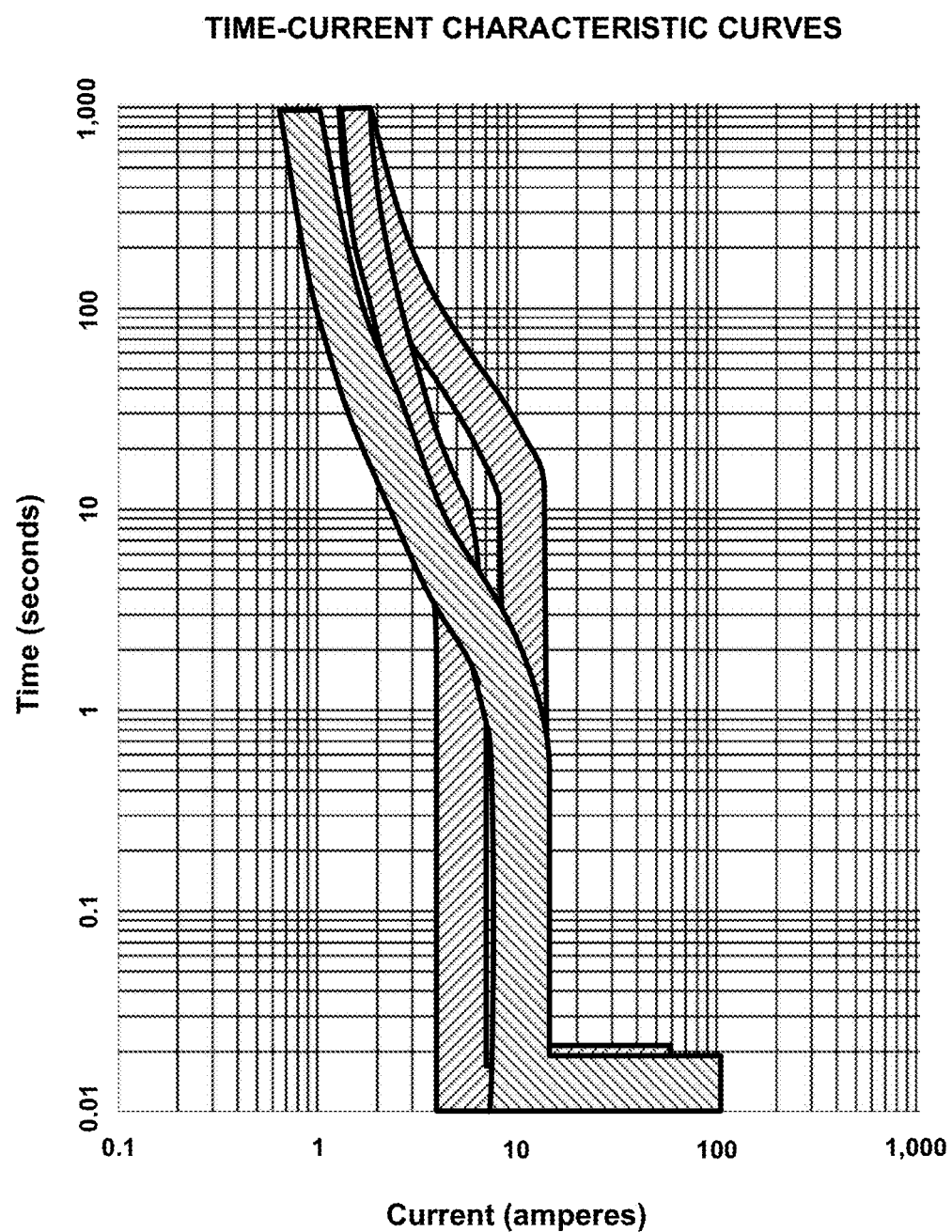
FIG. 2 is graph of the time-current uncertainty bands associated with three different conventional electromechanical circuit breakers, highlighting the difficulty that is encountered in completing a coordination study due to the overlapping bands.
Figure 5:
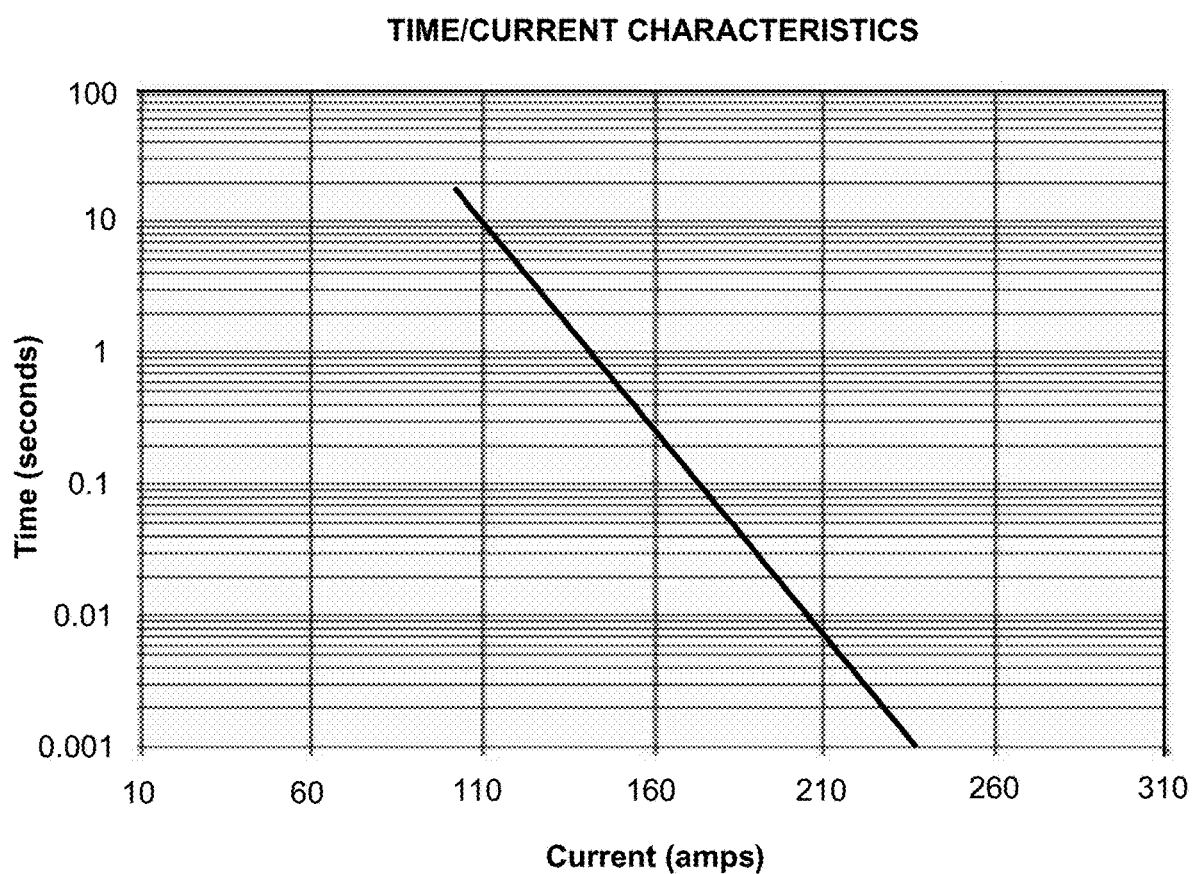
FIG. 5 is a graph showing the time-current characteristics of the PD depicted in FIG. 3, highlighting the single-line time-current characteristics of the PD.

In addition to having the ability to isolate a fault nearly instantaneously, another significant benefit provided by the PD 300 is that its time-current characteristics are much more precise than are the time-current characteristics of conventional circuit breakers. Solid-state devices can be manufactured repeatedly to have nearly identical operating characteristics. The repeatability in manufacturing significantly reduces variability from one solid-state device to another and, consequently, the variability from one PD 300 to another. In contrast, conventional electromechanical circuit breakers of the same type and rating, and even of the same type and rating from the same manufacturer, have time and current characteristics that tend to vary with a high degree of variability, resulting in a time-current characteristic profile having wide uncertainty bands, as was discussed above in reference to FIGS. 1 and 2. Here, because the PD 300 employs a solid-state device 306, no uncertainty bands are present in the time-current characteristics of the PD 300. The current conducted by solid-state devices can also be rapidly controlled and with a much higher degree of precision than is possible in conventional electromechanical circuit breakers. These attributes result in the PD 300 having a time-current characteristic profile represented by a single line, as illustrated in FIG. 5, i.e., without uncertainty bands to indicate that the operating characteristics of the PD 300 may vary from one PD to the next. (Compare FIG. 5 to FIG. 1 above).

All solid-state devices leak some amount of leakage current after being turned OFF. The amount of current that is leaked depends on the particular type of semiconductor device being used. Whether the leakage current has any possibility of presenting a safety concern will depend on the actual amount of current that is leaked and the voltages that are present in the section of the system where the leaked current flows. In most any circumstance the leakage current will not pose a safety hazard. However, to completely avoid any possibility that it could, and to ensure compliance with electrical codes, regulations and/or certification standards, the PD 300 further incorporates the air-gap disconnect unit 308. Upon the PD 300 determining that a fault or other exceedingly high and unacceptable overcurrent condition is present in the load circuit, the microcontroller 302 transmits an electrical pulse to a solenoid in the air-gap disconnect unit 308, which, as will explained in more detail below, responds to the electrical pulse by forming an air gap between the Line-IN and Line-OUT terminals of the PD 300. With the air gap formed, absolutely no current is able to flow into the load circuit.

Figure 6:
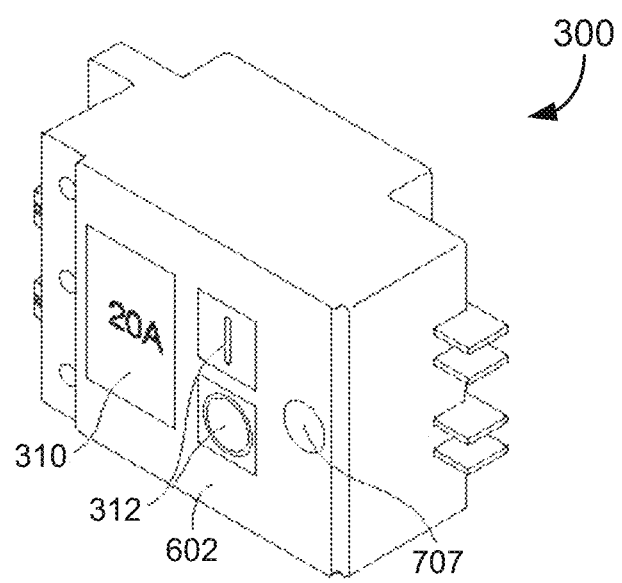
FIG. 6 is a perspective view of the PD depicted in FIG. 3, when housed in an enclosure.

FIG. 6 is a perspective view of the PD 300 depicted in FIG. 3, when housed in an enclosure. The enclosure includes a front face 602 with cut-outs for ON and OFF buttons 312; a cut-out for a display 310; and a cut-out for an air-gap disconnect reset button 707, which can be used to prevent the circuit breaker from being reset during maintenance or servicing work. Under the direction of the microcontroller 302, the display 310 can be controlled to display a variety of information including, for example, amperage rating, real-time line current and voltage information, PD name and other PD identification information, load information, panelboard identification information, and any other real-time or non-real-time information. In one embodiment of the invention the display 310 comprises an electronic ink display, which is a display technology that allows information the being displayed to continue to be displayed even after power to the display 310 has been removed.

Figure 7:
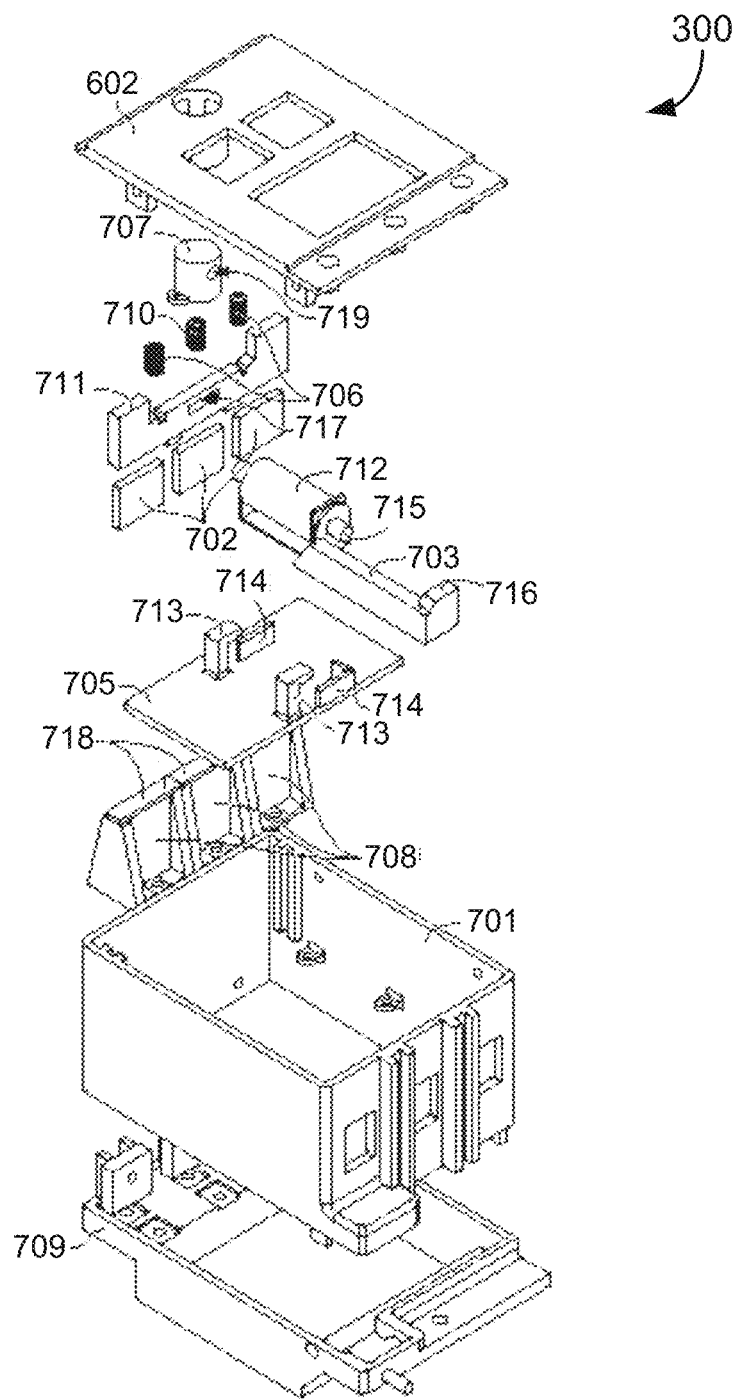
FIG. 7 is an exploded view of the PD depicted in FIG. 3, absent the PD's electronics, highlighting the physical attributes of the PD's air-gap disconnect unit.

FIG. 7 is an exploded view of the PD 300 without the electronics (microcontroller 302, sense and drive circuit 304, and solid-state device 306) shown. This exploded view of the PD 300 highlights the physical attributes of the PD's air-gap disconnect unit 308 and the various components involved in its operation. As shown in the drawing, the PD 300 is housed in an enclosure that includes: the front faceplate 602; mid enclosure member 701; and back enclosure member 709. A solenoid 712, which serves as an actuator for the air-gap disconnect unit 308, and associated holding member 703 are mounted next to one another on a mounting plate 705, with the holding member 703 designed to fit under L-shaped holders 713 and the solenoid 712 mounted alongside on solenoid mounts 714. The solenoid 712 includes a plunger 715, which under normal operating conditions (e.g., in the absence of a fault or overload condition) remains retracted in the solenoid housing. The holding member 703 is configured to slide in a direction parallel to the direction that the plunger 715 travels, and includes a tab 716 at one end. The tab 716 has a size and dimensions that allows it to fit inside a slot 717 formed through a central section of a connector blade holster 711. During normal operating conditions, when power is being distributed to the connected load and no fault or other undesired overload condition is present or developing in the load circuit, the tab 716 of the holding member 703 remains in the slot 717. With the tab 716 positioned in the slot 717, the holding member 703 holds the electrically conductive male connector blades 702 in corresponding electrically conductive receptacles 718 of a female line-to-load connector 708 and prevents holster retraction springs 706 from pulling the connector blade holster 711 and attached male connector blades 702 out of the receptacles 718. By holding the electrically conductive male connector blades 702 in the electrically conductive receptacles 718, line current is allowed to flow to the load (so long as the solid-state device 306 is also ON). However, upon the sense and drive circuit 304 sensing and reporting to the microcontroller 302 that a fault or exceedingly high and unacceptable overload condition is present or developing in the load circuit, the microcontroller 302 responds by transmitting an electrical pulse to the solenoid 712. The electrical pulse causes the solenoid 712 to eject its plunger 715. The holding member 703 is attached to the plunger 715. Accordingly, when the plunger 715 is ejected from the solenoid housing, the tab 716 of the holding member 703 is forced to be removed from the slot 717 in the connector blade holster 711. Once the tab 716 has been forced from the slot 717, the retraction springs 706 are able to lift the connector blade holster 711, pulling the attached electrically conductive male connector blades 702 out of the electrically conductive receptacles 718 of the female line-to-load connector 708. Pulling the male connector blades 702 out of the receptacles 718 results in the formation of an air gap, which serves to fully isolate the load from whatever fault or other potential hazard is developing or present. As explained above, because the air gap is in series with the solid-state device 306, any leakage current that might otherwise flow through solid-state device 306 and into the load circuit is also prevented.

It should be pointed out that the PD 300 depicted in FIG. 7 is an example of a three-phase PD. Accordingly, there are three male connector blades 702 attached to the bottom of the connector blade holster 711 and three corresponding receptacles 718 formed in the female line-to-load connector 708. In a single-phase PD, only a single male connector blade 702 and corresponding single female receptacle 718 would be needed to create the air gap. It should also be pointed out that the sense and drive circuit 304 described above in reference to FIG. 4 is an example of a sense and drive circuit 304 designed for use in a single-phase PD. In the case of a three-phase PD, the sense and drive circuit 304 could be modified for use in a three-phase PD, thereby allowing the modified sense and drive circuit 304 to react to any type of fault or undesired overload condition, including three-phase and single-line ground faults.

During the air-gap disconnect process a compression spring 710 forces the air-gap-disconnect reset button 707 to eject from (i.e., to 'pop out of') the faceplate 602 of the front enclosure member 704. The air-gap-disconnect reset button 707 has a hole 719, through which a maintenance or service worker can insert a padlock or other locking device to complete a lockout-tagout (LOTO) safety procedure. Completing the LOTO safety procedure ensures that the PD 300 will not be accidentally reset by the maintenance or service worker and will not be inadvertently reset by other persons unaware of the hazard or potential hazard. Once the hazard or potential hazard has been cleared by the maintenance or service worker, the padlock or other locking device can then be removed and the PD 300 can be reset by pressing the air-gap-disconnect reset button 707 back into the enclosure. Pushing the air-gap-disconnect reset button 707 back into the enclosure forces the electrically conductive male connector blades 702 to be reinserted into the electrically conductive receptacles 718 of the female line-to-load connector 708 and allows the tab 716 at the end of the holding member 703 to be reinserted into the slot 717 in the connector blade holster 711. Note that the solenoid 712 has an internal spring that pulls the plunger 715 back into the solenoid housing shortly after it has been ejected and the air-gap has been formed. Since the holding member 703 is also attached to the plunger 715, when the plunger 715 is pulled back into the solenoid the holding member 703 is also pulled back to it normal operating condition position and the tab 716 at the end of the holding member 703 is reinserted into the slot 717. With the tab 716 reinserted in the slot 717, the holding member 703 is then able to once again hold the male connector blades 702 in the receptacles 718 of the female line-to-load connector 708 without the retraction springs 706 pulling the connector blade holster 711 and attached male connector blades 702 out of the receptacles 718. The holding member 703 will then continue to hold the male connector blades 702 in the receptacles 718 until the air-gap disconnect process is once again activated.

During the resetting of the air-gap disconnect unit 308, and as a high-voltage connection is made in the PD 300, signal bounce can be undesirably directed into the low voltage power supply used to power the electronics in the PD 300. This undesirable signal bounce phenomenon is due to the intrinsic capacitance of the system and the sudden application of high-voltage across the PD's line-IN and line-OUT terminals. To avoid the undesired signal bounce, in one embodiment of the invention the tips of the male connector blades 702 are designed to have a high resistance, so that when they are first inserted into the receptacles 718 of the female line-to-load connector 708 the intrinsic capacitance of the system if forced to charge up much more slowly. By employing the resistive tips, a two-stage reconnect process thus results—a first stage during which the resistive tips just come in contact with the receptacles 718 to dampen signal bounce and a second stage during which the male connector blades 702 are fully inserted into the receptacles 718 to complete electrical contact and disengage the air-gap.

In the description above, the air-gap disconnect process is activated automatically upon the sense and drive circuit 304 determining that a fault or other potentially harmful overload condition is present or developing in the load circuit. The PD 300 also provides an OFF button (see ON and OFF buttons in FIG. 6), which a person can depress to manually activate the air-gap disconnect process. When the person depresses the OFF button, the microcontroller 302 responds by sending an electrical pulse to the solenoid 712 to activate the air-gap disconnect process.

Figure 9A:
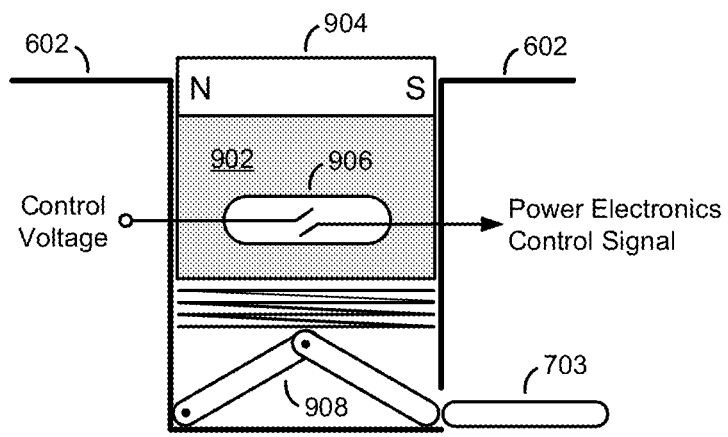
FIGS. 9A-9C are drawings of a manual/mechanical push button switch that may be incorporated into the PD depicted in FIG. 3 and that a person can depress to switch OFF power to the solid-state device and force the air-gap disconnect unit of the PD to form an air gap.
Figure 9B:
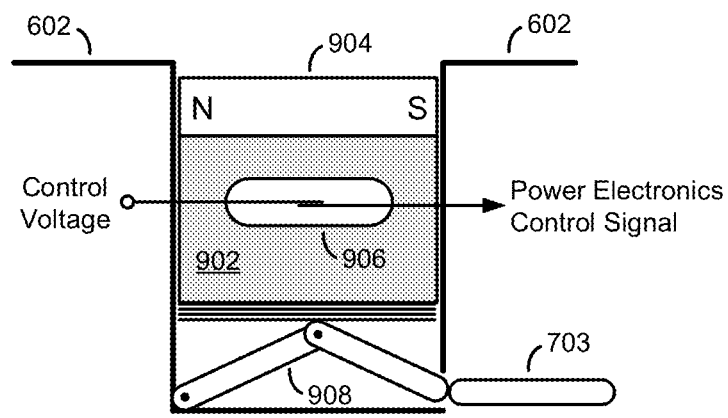
Figure 9C:
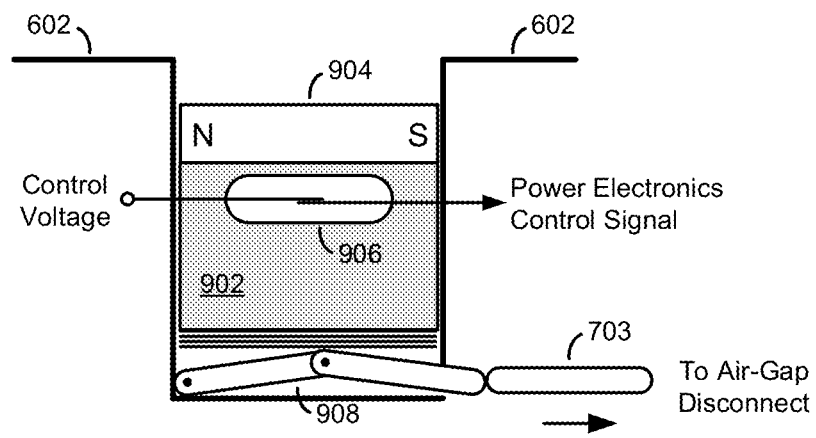

The manual approach to forming the air gap described in the preceding paragraph is sufficient and effective in many circumstances. However, some local electrical codes/regulations and/or national or multi-national certification companies such as the UL (Underwriters Laboratory), for example, require that a circuit breaker provide a person the ability to switch OFF the circuit breaker entirely by way of mechanical manipulation, i.e., without any electrical assistance. To comply with this requirement, in one embodiment of the invention the OFF button (or some other button in addition to the OFF button) is included that allows the air gap to be formed purely via mechanical manipulation. FIGS. 9A-C illustrates this aspect of the present invention, in the form of a manual/mechanical push-button 902. As can be seen in the sequence of drawings, which are ordered chronologically, when a person pushes the push-button 902 into the faceplate 602 an actuating member 908 extends and pushes the holding member 703 in the air gap disconnect unit so that the tab 716 disengages from the slot 717 in the connector blade holster 711. (See FIG. 7 and accompanying description above.) With the tab 716 removed from the slot 717, the retraction springs 706 are able to lift the connector blade holster 711 and attached male connector blades 702 out of the female receptacles 718 and thereby form the air gap. Note that compared to the manual disconnect approach described in the previous paragraph, the air gap is formed entirely by way of mechanical manipulation and without any assistance from the electrically-controlled solenoid 712.

The manual/mechanical push-button 902 depicted in FIGS. 9A-9C is also equipped with a reed switch 906, which is configured to close when the push-button 902 is partly depressed and a permanent magnet 904 comes in close proximity. As illustrated in FIG. 9B (button partly but no fully depressed), when the reed switch 902 is closed a control voltage is allowed to pass through the switch. This control voltage serves as a control signal to turn OFF the power electronics in the PD 300.

Subsequently, when the push-button 902 is further and fully depressed (as in FIG. 9C) the actuating member 908 fully extends and pushes the holding member 703 in the air-gap disconnect unit 308 so that the tab 716 at the end of the holding member 703 disengages from the slot 717 and the retraction springs 706 lift the male connector blades 702 out of the female receptacles 718 and form the air gap. By turning off the power to the electronics in the PD 300 (FIG. 9B) before forming the air gap (FIG. 9C) arcing is prevented from occurring in the air gap disconnect assembly during the time the air gap is being formed.

It should be mentioned that the manner by which the holding member 703 is mechanically manipulated to disengage it from the connector blade holster 711 need not necessarily be performed in the manner depicted in FIGS. 9A-9C. The approach depicted in FIGS. 9A-9C (using actuating member 908) is merely one example. The more important points to be gleaned from the drawings in FIGS. 9A-9C are that: 1) formation of the air gap is made in response to a person's physical command and entirely by way of mechanical manipulation (i.e., without the need for any electrical assistance; and 2) electrical power to the electronics in the PD 300 is removed prior to forming the air gap, thereby preventing arcing from occurring in the air gap disconnect assembly. It should also be mentioned that there is no requirement that a reed switch be used to turn OFF the power to the PD's electronics. Any suitable switch type could be used, so long as the switch can operate in cooperation with the manual/mechanical air gap assembly and serve to remove power to the PD's electronics prior to forming the air gap.

As illustrated in FIG. 3, the PD 300 further includes a non-transitory computer readable medium (CRM) 316, e.g., flash memory, read-only memory (ROM), random-access memory (RAM), magnetic hard drive, etc. The non-transitory CRM 316 may be external to the microcontroller 302 (as shown in FIG. 3), embedded in the microcontroller 302, or may comprise non-transitory CRM that is partly embedded in the microcontroller 302 and partly external to the microcontroller 302. The CRM 316 is configured to store computer program instructions that direct how the PD 300 generally operates; instructions and protocol that direct how and when the microcontroller 302 communicates with other computing device(s) connected to the comm/control bus; and/or instructions that determine how and when the PD 300 collects information (e.g., line current and voltage information) and how and when that information is reported to the other computing device(s) in electrical communications with the comm/control bus.

Figure 8:
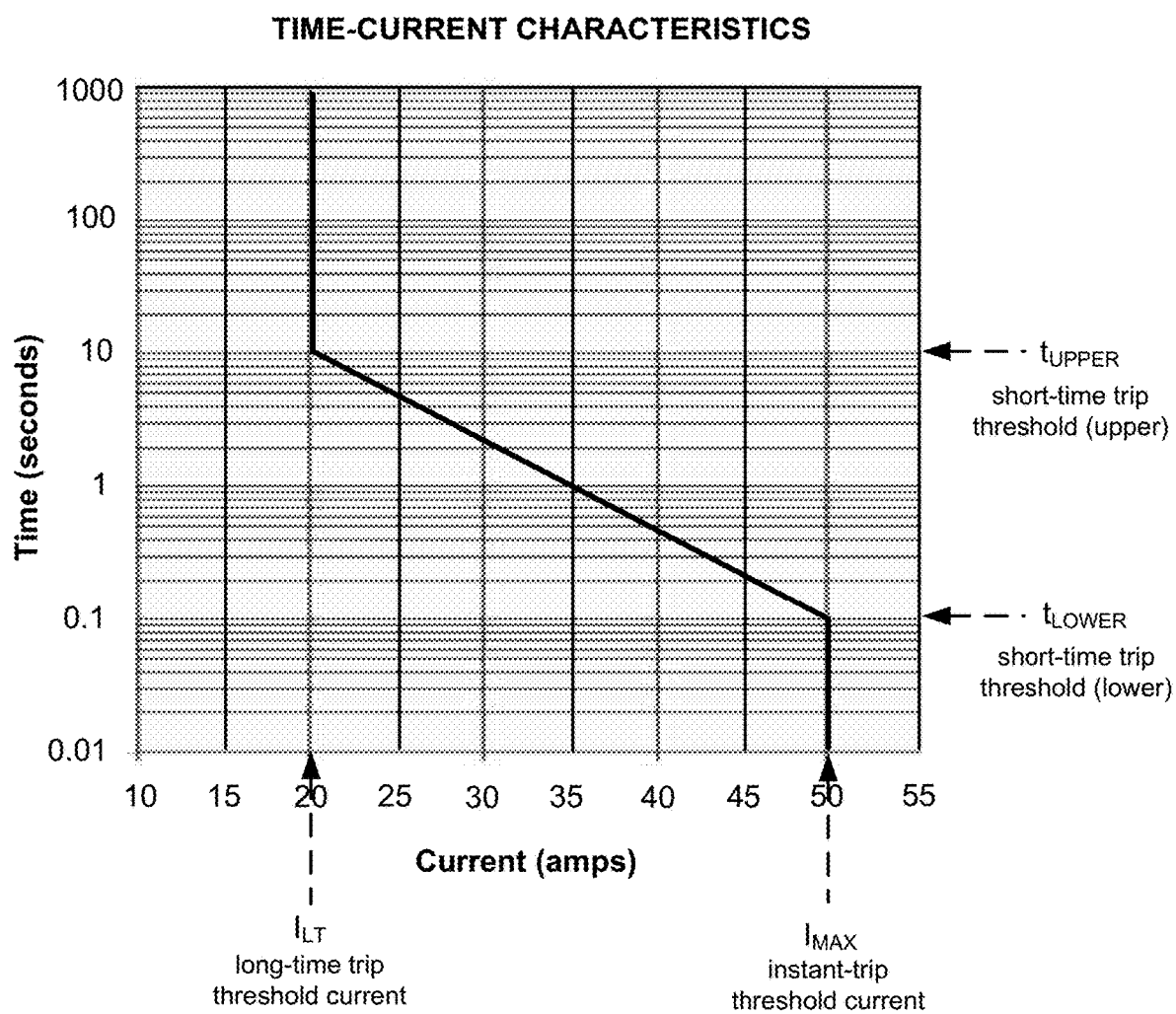
FIG. 8 is a graph showing the time-current characteristics of the PD depicted in FIG. 3, highlighting the fact that in one embodiment of the invention the PD's operational parameters, including the maximum rate of change in current di/dt_max, long-time trip threshold current $I_{LT}$, instant-trip threshold current $I_{MAX}$, and upper and lower short-time trip time thresholds $t_{UPPER}$ and $t_{LOWER}$, are user programmable.

In one embodiment of the invention, the computer program instructions stored in the CRM 316 further include computer program instructions that provides the microcontroller 302 the ability to set and vary the PD's 300's operational parameters, such as, for example, the maximum rate of change in current di/dt_max, long-time trip threshold current $I_{LT}$, instant-trip threshold current $I_{MAX}$ used by the sense and control circuit 304; and/or the upper and lower short-time trip time thresholds $t_{UPPER}$ and $t_{LOWER}$ for the PD 300. As illustrated in the exemplary time-current characteristics of the PD 300 in FIG. 8, the "upper" short-time trip time threshold $t_{UPPER}$ establishes how long the PD 300 will tolerate a load current higher than the long-time trip threshold current $I_{LT}$. The "lower" short-time trip time threshold $t_{LOWER}$ establishes how long the PD 300 will tolerate a load current just below the instant-trip threshold current $I_{MAX}$. The microcontroller's 302's ability to adjust the long-time trip threshold current $I_{LT}$, instant-trip threshold current $I_{MAX}$, and/or upper and lower short-time trip time thresholds $t_{UPPER}$ and $t_{LOWER}$ provides a user great flexibility in configuring the PD 300 for any particular application. This flexibility, together with the fact that the time-current characteristics are precise (i.e., do not have wide uncertainty bands, as are present in the time-current characteristics of conventional electromechanical circuit breakers (see FIGS. 1 and 2 above) and the fact that the time-current characteristics of the PD 300 can be controlled with a high degree of precision, greatly simplifies any coordination study that may be performed using a plurality of the PDs 300. Moreover, even after the PDs 300 have been installed in an electrical distribution system mapped according to a completed coordination study, any one or more of the long-time trip threshold current $I_{LT}$, instant-trip threshold current $I_{MAX}$, used vary the long-time trip threshold current $I_{LT}$, and upper and lower short-time trip time thresholds $t_{UPPER}$ and $t_{LOWER}$ of any one or more of the PDs 300 in the distribution system can be readjusted, as necessary or desired, for example to accommodate changing load conditions in the distribution system.

As was discussed in reference to FIG. 4 above, the di/dt detection circuitry in the sense and drive circuit 304 provides the PD 300 the ability to distinguish between a short circuit condition and a large inrush current that occurs when an inductive load (e.g., an induction motor) is being brought online. An off the line start of a fully loaded induction motor can draw an inrush current that is 10-12 times the motor's full load current. To ensure that the PD 300 is able to withstand these large inrush currents yet not expose the PD's solid-state device 306 to exceedingly high and prolonged inrush currents that might possibly damage the solid-state device 306, in one embodiment of the invention the microcontroller 302 of the PD 300 is further programmed to monitor inrush events so that the solid-state device 306 in the PD 300 is never able to operate outside its "safe operating area" (SOA) during any inrush event. A solid-state device manufacturer will typically specify the maximum power its solid-state device can dissipate over a given period of time without being damaged. This specification is equivalent to the maximum energy $E_{max}$ that the solid-state device is able to absorb (and not dissipate via a heatsink) without failure. The total energy $E_{Total}$ absorbed by the solid-state device 306 during the time an inductive load is being brought online increases as the inrush current increases. Accordingly, to prevent the solid-state device 306 in the PD 300 from being damaged during an inrush event, the total energy absorbed $E_{Total}$ should not ever be allowed to exceed the maximum energy $E_{max}$ specification.

Figure 10:
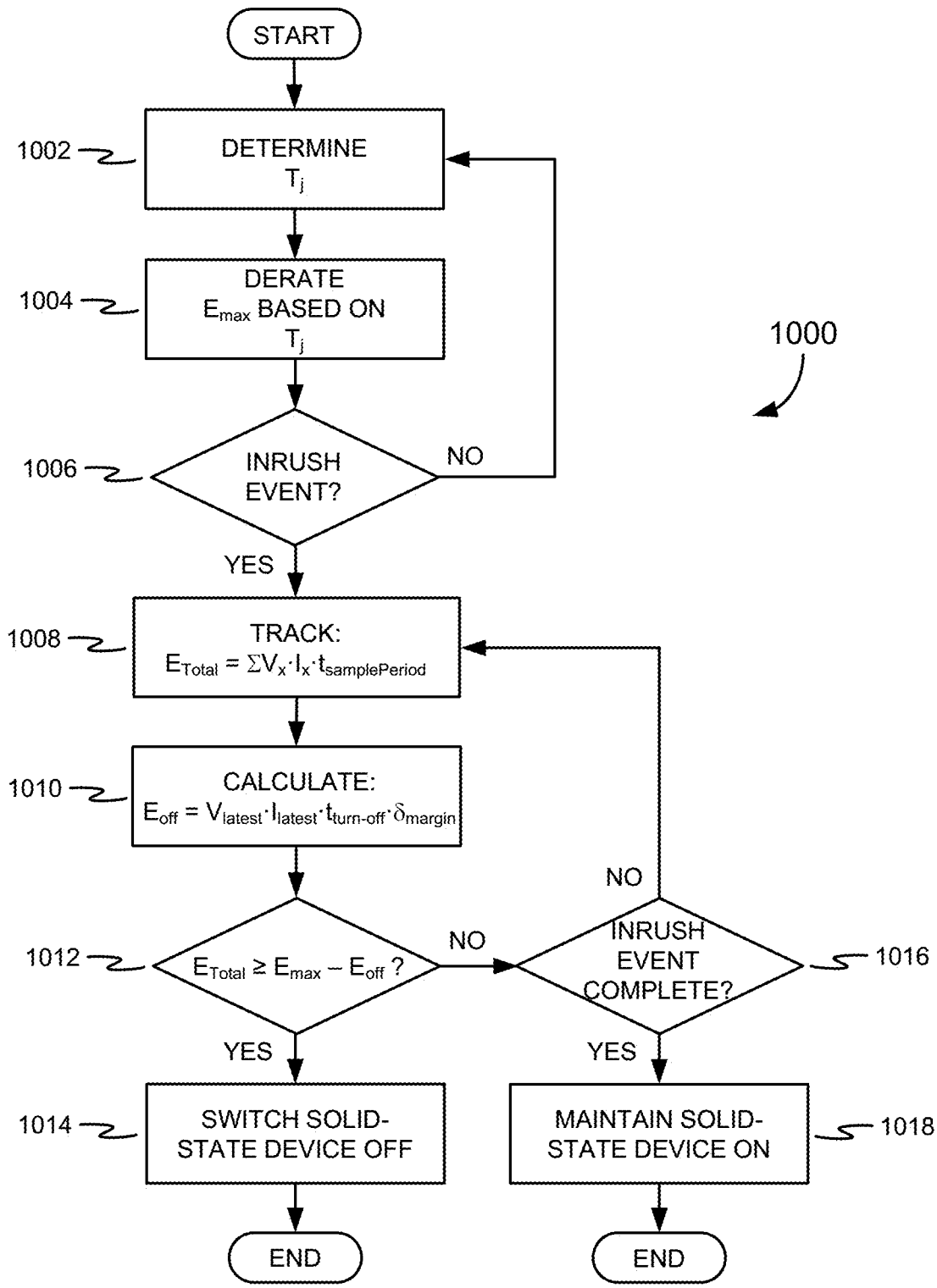
FIG. 10 is a flowchart depicting a method that the microcontroller in the PD depicted in FIG. 3 may be programmed to follow in order to prevent the PD's solid-state device from exceeding its safe operating area (SOA) during an inrush event.

FIG. 10 is a flowchart depicting one method 1000 that the microcontroller 302 of the PD 300 is programmed to follow in order to prevent the solid-state device 306 in the PD 300 from ever exceeding its SOA during the progression of an inrush event. Note that the various steps in the method 1000 are not necessarily performed in the order shown in the flowchart. Further, some steps in the method 1000, for example decision 1006, are performed continuously, rather than as discrete and sequential steps in the overall process. The first two steps 1002 and 1004 in the method 1000 involve determining the junction temperature $T_j$ of the solid-state device 306 and derating the manufacturer-provided $E_{max}$ specification based on the determined junction temperature $T_j$. Solid-state device manufacturers will typically only specify an $E_{max}$ for a specific temperature (e.g., 25 C). However, in practice the junction temperature $T_j$ of the solid-state device will likely be different and often higher than the junction temperature corresponding to the manufacturer's $E_{max}$ specification. Accordingly, in accordance with this embodiment of the invention, by determining the junction temperature $T_j$ shortly before the occurrence of an inrush event, the $E_{max}$ specification can be derated to provide a more safe and accurate upper limit for $E_{max}$.

Figure 11:
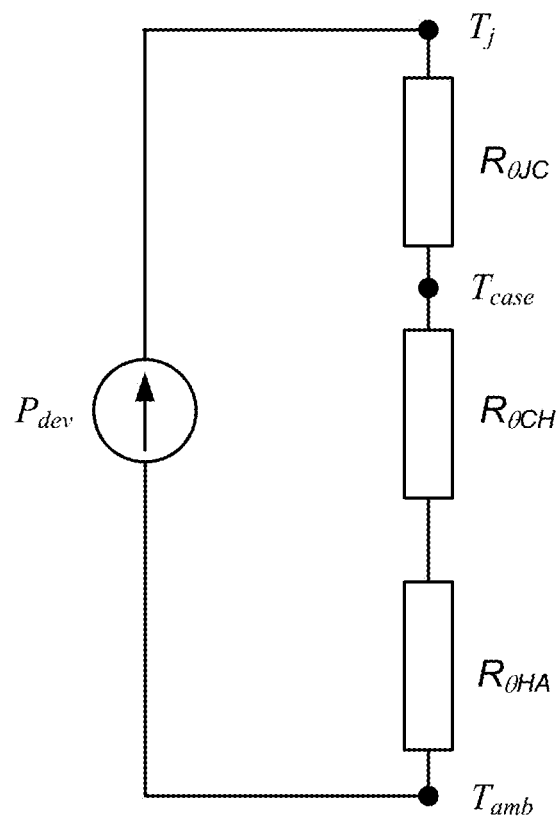
FIG. 11 is a drawing of a thermal circuit model that the method depicted in FIG. 10 is based on, in accordance with one embodiment of the invention.

In one embodiment of the invention the junction temperate $T_j$ is determined by measuring the temperature of the case ($T_{case}$) within which the solid-state device 306 is housed (using a thermocouple, for example), and then using a thermal model (see FIG. 11) to extrapolate what the junction temperature $T_j$ is. Based on this thermal model, the steady-state power $P_{dev}$ dissipated by the solid-state device 306 can be shown to be:

$$P_{dev} = (T_j - T_{case})R_{\theta JC} + (T_{case} - T_{amb})(R_{\theta CH} + R_{\theta HA}),$$

where $T_{case}$ is the temperature of the case within which the solid-state device 306 is housed, $T_{amb}$ is the ambient temperature, $R_{\theta JC}$ is the junction-to-case thermal resistance, $R_{\theta CH}$ is the case-to-heatsink thermal resistance, and $R_{\theta HA}$ is the heatsink-to-ambient thermal resistance. From this equation the junction temperature $T_j$ can be determined:

$$T_j = \frac{P_{dev} - (R_{const} - R_{\theta JC})T_{case} + R_{const}T_{amb}}{R_{\theta JC}},$$

where $R_{const} = R_{\theta CH} + R_{\theta HA}$ is a known constant under steady state conditions, $T_j$ and $P_{dev}$ are both measurable quantities, and $T_{amb}$ can be assumed to be at a maximum (e.g., 40 C, which for most applications is sufficient).

After the junction temperature $T_j$ is determined in step 1002, in step 1004 the maximum energy $E_{max}$ specification provided by the solid-state device manufacturer is derated to provide the safer and more accurate upper limit for $E_{max}$. (Alternatively, if the solid-state switch has been in an OFF state for longer than the junction-to-ambient thermal propagation delay (typically 20 to 30 seconds), the case temperature $T_{case}$, which will have equalized to the same temperature as the junction (i.e., $T_j = T_{case}$) can be used as a basis for derating $E_{max}$.) This process of determining the junction temperature $T_j$ and derating $E_{max}$ is performed ever so often before, so that the most up-to-date junction temperature $T_j$ and derating of $E_{max}$ are available just prior to the onset of an inrush event.

Decision 1006 in the method 1000 is the decision that determines the onset of an inrush event. This decision 1006 is performed continuously by the sense and drive circuit 304, similar to as explained above in reference to FIG. 4. Upon decision 1006 determining the onset of an inrush event at decision 1006, at step 1008 the microcontroller 302 immediately begins calculating and tracking the cumulative energy $E_{Total}$ being absorbed by the solid-state device 306 as the inrush current rises. The cumulative energy $E_{Total}$ absorbed by the solid-state device 306 is calculated, sample-by-sample, by summing the product of digitized voltage and current samples $V_x$ and $I_x$ over time, i.e., $E_{Total} = \Sigma V_x \cdot I_x \cdot t_{samplePeriod}$, where $V_x$ and $I_x$ represent the digitized voltage and current samples and $t_{samplePeriod}$ is the sampling period.

After each sample period $t_{samplePeriod}$ (or after every few sample periods), at step 1010 the microcontroller 302 calculates the amount of energy $E_{off} = V_{latest} \cdot I_{latest} \cdot t_{turn-off} \cdot \delta_{margin}$ that would be required to turn the solid-state device 306 OFF. Here, $V_{latest}$ and $I_{latest}$ are the latest sampled voltage and current samples $V_x$ and $I_x$, $t_{turn-off}$ is the amount of time needed for the PD's driver circuitry to respond and turn off the solid-state device 306, and $\delta_{margin}$ is a margining factor that guards against underestimating the energy and/or time actually needed to switch the solid-state device 306 OFF.

Next, at decision 1012, the microcontroller 302 subtracts the $E_{off}$ calculated in step 1010 from the derated $E_{max}$ determined in step 1004 and then compares the result to the $E_{Total}$ determined in step 1008. If the microcontroller 302 determines that $E_{Total} \geq E_{max}(derated) - E_{off}$, that determination is an indication that the solid-state device 306 is or is about to begin operating outside its SOA. To prevent the solid-state device 306 from being damaged or destroyed, at step 1014 the microcontroller 302 immediately sends a gating signal to the solid-state device 306, commanding it to switch OFF. If, on the other hand, $E_{Total} < E_{max}(derated) - E_{off}$ at decision 1012, the method proceeds to decision 1016, which queries whether the inrush event has ended. If "YES," the solid-state device 306 is allowed to remain ON (step 1018), the inductive load is allowed to be brought fully online, and the method 1000 ends. If, on the other hand, the inrush event is determined to be still ongoing at decision 1016 (e.g., if $I_{latest} > I_{LT}$), the method loops back to step 1008. Steps 1008 and 1010 and decision 1012 are then repeated until either the solid-state device 306 is switched OFF due to the SOA being exceeded or the inrush event ends.

Figure 12:
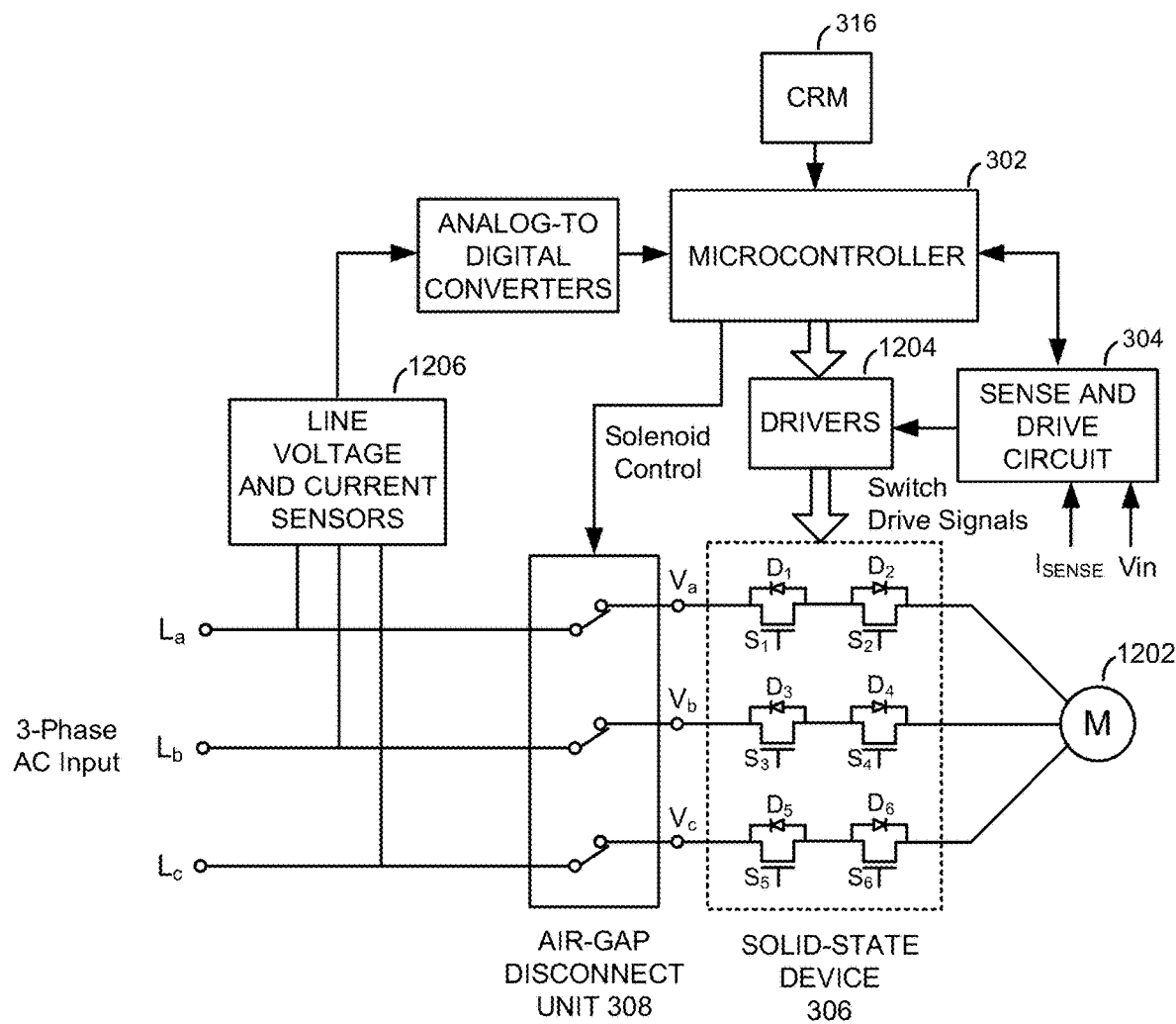
FIG. 12 is a block diagram illustrating one way that the solid-state device of the PD depicted in FIG. 3 can be constructed and configured when serving as a PD for a three-phase induction motor.
Figure 13A:
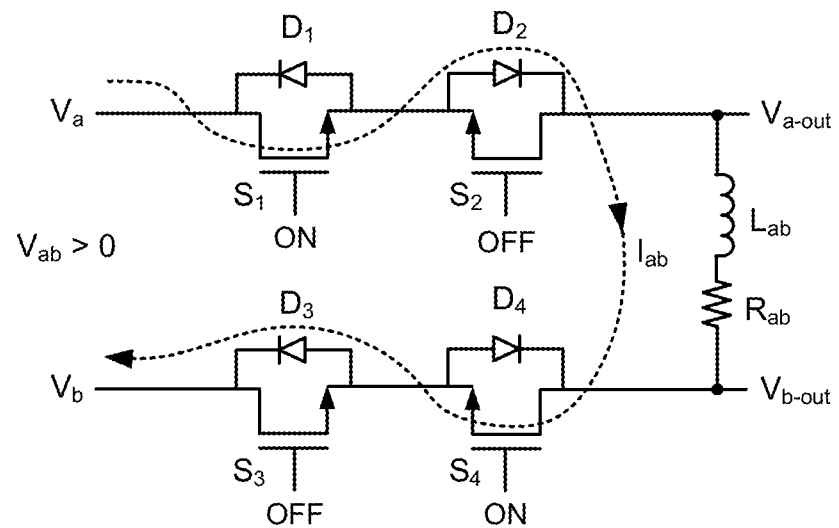
FIGS. 13A and 13B are drawings illustrating how two switching pairs associated with one phase of the three-phase induction motor are controlled to prevent or inhibit voltage transients from forming during a soft starting of the induction motor.
Figure 13B:
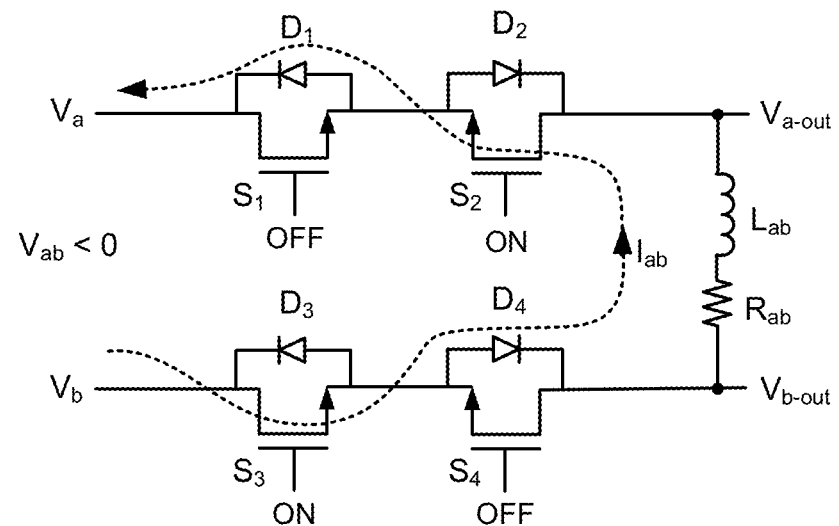

During an off the line start of an induction motor, large torques can be generated by the induction motor. These large torques are undesirable since they can mechanically stress and damage the motor and/or equipment (e.g., belts, pulleys, gears, etc.) that the motor is being used to drive. To prevent high torques from being generated, in one embodiment of the invention the computer program instructions stored in the CRM 316 further include computer program instructions that provides the microcontroller 302 the ability to facilitate the soft starting of an induction motor load. In this embodiment of the invention the solid-state device 306 in the PD 300 comprises two or more, depending on whether the induction motor is a single phase induction motor or a three-phase induction motor, MOSFET switching pairs. FIG. 12 is a drawing illustrating how the solid-state device 306 in the PD 300 is configured in the case of a three-phase induction motor load. As can be seen, the gating of the three switching pairs $S_1/S_2$, $S_3/S_4$ and $S_5/S_6$ that make up the solid-state device 306 are controlled by the PD's 300's microcontroller 302, via drivers 1204. FIGS. 13A and 13B illustrates how the two switching pairs $S_1/S_2$ and $S_3/S_4$ disposed in lines $L_a$ and $L_b$ are controlled by the microcontroller 302 to facilitate the soft starting of the three-phase induction motor 1202. Upon an off the line start of the induction motor 1202, the microcontroller 302 controls the drive signals applied to the MOSFET switching pairs $S_1/S_2$ and $S_3/S_4$ so that the duty cycle of the line-line (L-L) voltage $V_{ab}$ progressively increases. This process is repeated for the other two phases of the induction motor 1202. By progressively increasing the duty cycles of the $L_a$-$L_b$, $L_b$-$L_c$ and $L_a$-$L_c$ voltages $V_{ab}$, $V_{bc}$, $V_{ac}$ applied to the three phases of the induction motor, the induction motor 1202 is forced to gradually increase it rotational speed as it is being brought online. Since the torque generate by the motor is proportional to the square of the applied line voltages, high motor torques are therefore avoided during the soft start process.

In one embodiment of the invention the microcontroller 302 of the PD 300 is further programmed to control the switching of the MOSFET switching pairs $S_1/S_2$, $S_3/S_4$ and $S_5/S_6$ during the soft start process in a manner that prevents exceedingly high voltage transients from occurring as the MOSFET switching pairs $S_1/S_2$, $S_3/S_4$ and $S_5/S_6$ are switched between positive and negative half cycles. Focusing again on $L_a$-$L_b$ during the soft start when $V_{ab}$ is positive, MOSFET switches $S_1$ and $S_4$ are switched ON and MOSFET $S_2$ and $S_3$ are switched OFF. As illustrated in FIG. 13A, this results in the phase current $I_{ab}$ flowing through the drain-source path of MOSFET switch $S_1$ and body diode of MOSFET switch $S_2$, then through the a-b stator winding (represented by $L_{ab}$ and resistor $R_{ab}$ in the drawing), and finally returning through the drain-source path of MOSFET switch $S_4$ and body diode of MOSFET switch $S_3$. As the $L_a$-$L_b$ voltage $V_{ab}$ decreases toward the end of its positive half cycle and crosses zero (i.e., enters its negative half cycle), the corresponding phase current $I_{ab}$ will continue flowing in the direction shown in FIG. 13A, and will continue flowing in that direction until the magnetic energy in the inductor $L_{ab}$ dissipates. Using phase current information sensed/measured by the line voltage and current sensors 1206, the microcontroller 302 monitors $I_{ab}$ and directs MOSFET switches $S_1$ and $S_4$ to switch OFF and MOSFET switches $S_2$ and $S_3$ to switch ON (as depicted in FIG. 13B) but only after it determines that the phase current $I_{ab}$ has (or is just about to be) reduced to zero. During the time the magnetic energy in the inductor $L_{ab}$ is dissipating, the body diodes $D_3$ and $D_2$ of MOSFET switches $S_3$ and $S_2$ block current from reversing, so no sudden change in the phase current $I_{ab}$ current is allowed to occur, despite $V_{ab}$ entering its negative half cycle. Accordingly, by delaying the switching ON of MOSFET switches $S_2$ and $S_3$ and the switching OFF of MOSFET switches $S_1$ and $S_4$ until after the phase current $I_{ab}$ reduces to zero, large switching voltage transients are avoided. This same approach is applied to the other two phases during the soft start process, thus obviating any need for additional voltage transient suppression filters or systems.

Figure 14:
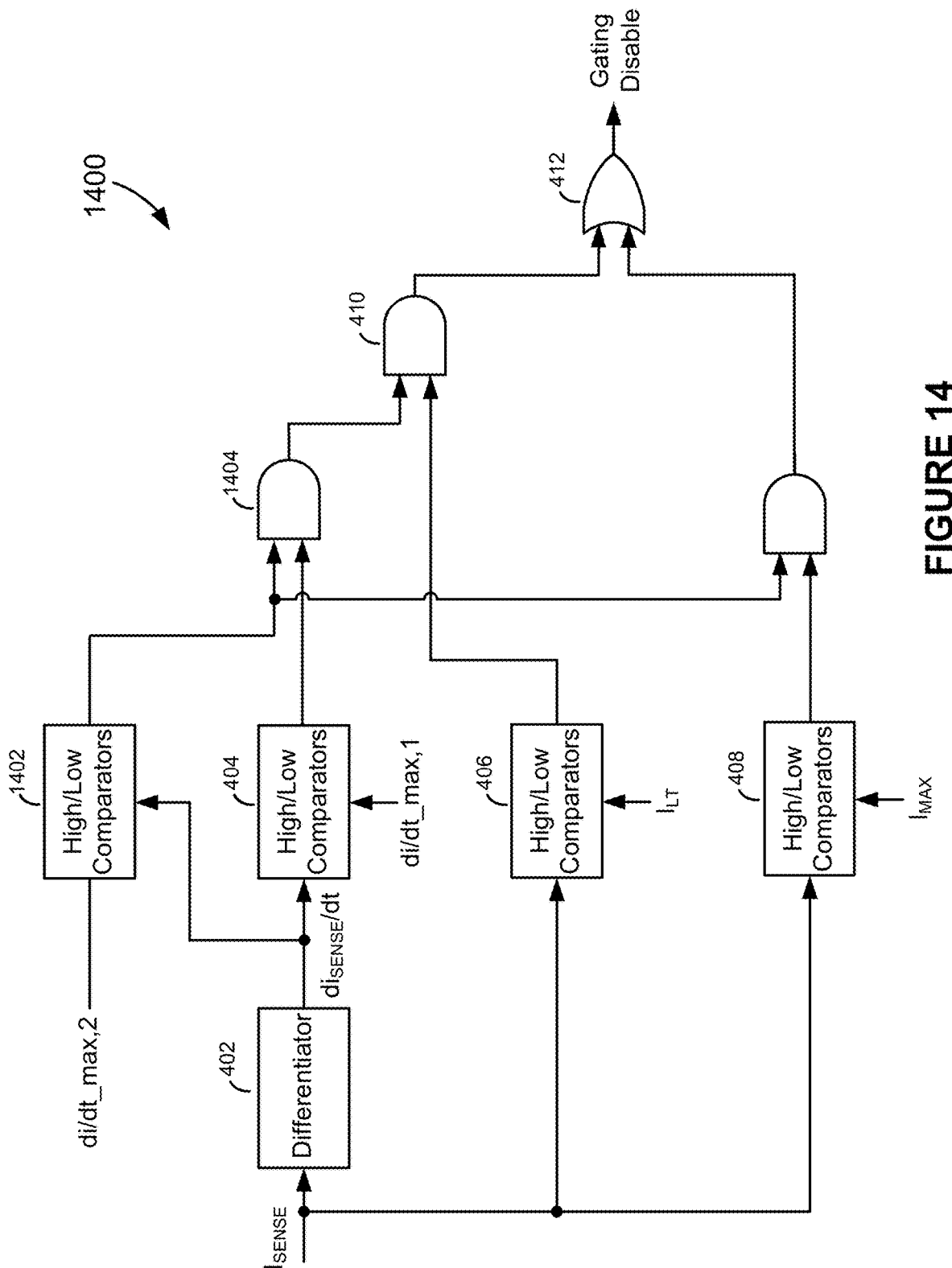
FIG. 14 is a drawing of a sense and drive circuit that can be employed in the PD depicted in FIG. 3 and which is equipped with the ability to detect the occurrences of lightning surges and distinguish between current surges due to lightning strikes and current surges due to short circuit conditions.

Some certification bodies (e.g., the UL) require that a circuit breaker be capable of operating through a lightning strike, i.e., without unnecessarily tripping. A lightning strike is of short duration, about 30 µs, and can reach current levels in the 1-2 kA range. In one embodiment of the invention, the sense and drive circuit 304 of the PD 300 discussed above in reference to FIG. 4 is modified to include circuitry that detects the occurrence of a lightning strike and distinguish between the high-current lightning strike condition and a short circuit condition. The ability to distinguish between a lightning strike and a short circuit condition is beneficial since if a sudden and large increase in current is determined to be attributable to a lightning strike, the PD 300 can be prevented from unnecessarily switching OFF. FIG. 14 is a drawing of a sense and drive circuit 1400 that includes circuitry capable of both detecting the occurrence of a lightning strike and differentiating between a lightning strike and a short circuit condition. The sense and drive circuit 1400 is similar to the sense and drive circuit 304 discussed above (see FIG. 4 and accompanying description), except that it further includes a fourth high/low comparator 1402 and an additional AND logic gate 1404. The sense and drive circuit 1400 operates based on the fact that a sudden rise in current attributable to a lightning strike is greater than the sudden rise in current caused by a short circuit, i.e., di/dt_lightning>di/dt_short. The high/low comparator 1402 is configured to compare $di_{SENSE}/dt$ to a current rate of change reference di/dt_max,2, which is greater than the current rate of change reference di/dt_max,1 used by the comparator 404 in detecting a short circuit condition. During the occurrence of a lightning strike, $di_{SENSE}/dt$ will be greater than di/dt_max,2, so the high/low comparator 1402 will produce a logic LOW at its output. This logic LOW is propagated to the input of the OR gate 412, via AND gates 1404 and 410. Accordingly, during a lightning surge, the output of the OR gate 412 will remain at a logic LOW and the PD 300 will continue operating through the lightning strike, i.e., will not trip or switch OFF. If, on the other hand, di/dt_max,2>$di_{SENSE}/dt$>di/dt_max,1, the sense and drive circuit 1400 will operate in similar to the sense and drive circuit 304 described above in FIG. 4, in order to determine whether the sudden increase in line current might be due to an impending fault or exceedingly high overload condition. Specifically, if $di_{SENSE}/dt$ exceeds di/dt_max,1 AND the current being drawn from the line (as represented by the sense current $I_{SENSE}$) exceeds the long-time trip threshold current $I_{LT}$ (together an indication that short circuit is developing), the AND logic gates 1404 and 410 will both generate a logic HIGH output, and the final OR gate 412 will then also produce a logic HIGH gating disable output to switch the solid-state device 306 OFF.

In another embodiment of the invention, the voltage dropped across the solid-state device 306 is used to detect the occurrence of a lightning strike and distinguish between a lightning strike and a short circuit condition. Upon the arrival of a lightning surge, the line voltage will spike significantly and can only be attributable to a lightning strike. However, when a short circuit condition is developing, the line voltage $V_{line}$ remains the same (or dips to a lower value). Since during a lightning strike the line voltage will exceed the applied line voltage $V_{line}$, the upper current boundary $I_{upper}$ of the line current (which can be by integrating $di/dt=V_{line}/L$, where L is the inductance of the system) will increase to a much higher value during a lightning surge than it will during the developing of a short circuit. Accordingly, by monitoring the voltage dropped across the solid-state device 306 and comparing it to $I_{upper} \times R_{DS}(ON)$, where $R_{DS}(ON)$ is the ON resistance of the solid-state device 306, the occurrence of a lightning strike can be detected and distinguished from a short circuit condition.

Figure 15:
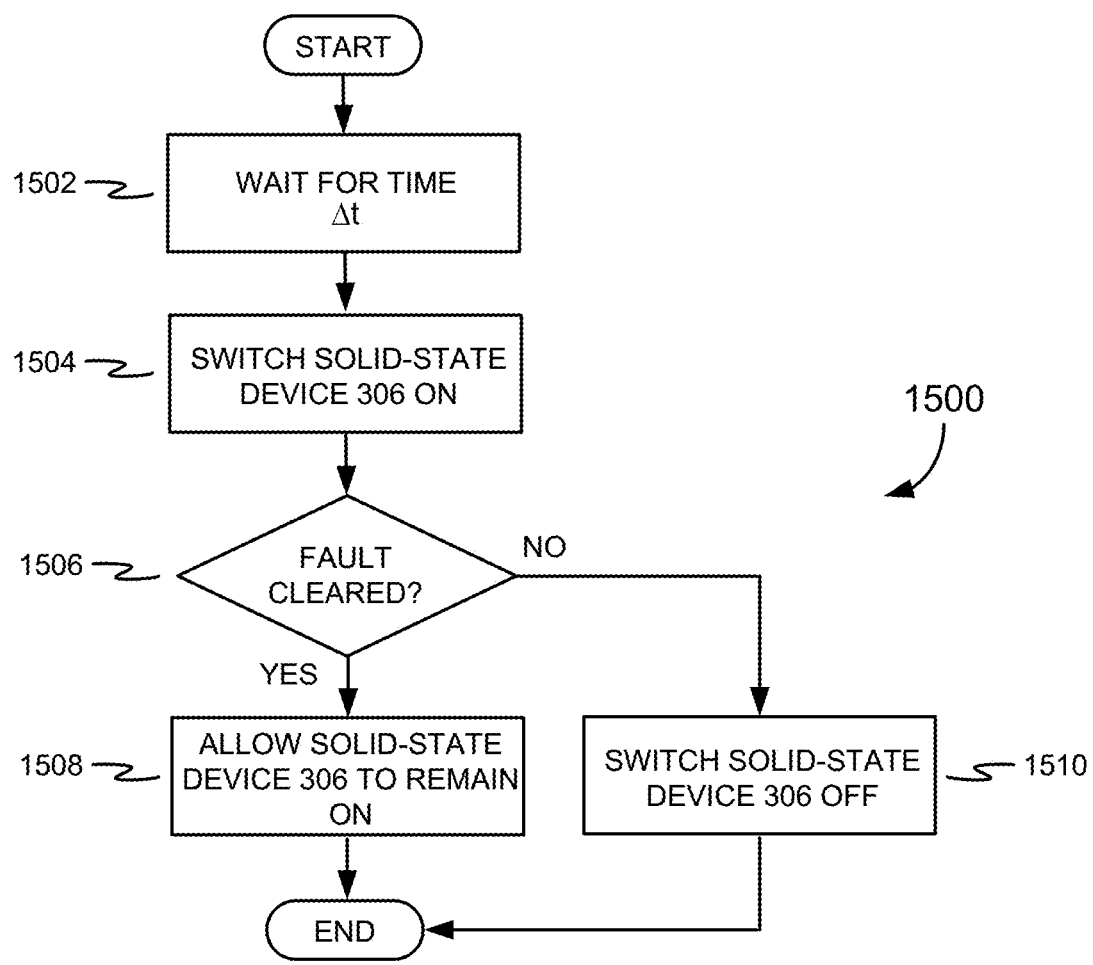
FIG. 15 is a flowchart depicting a fault verification method that the microcontroller in the PD depicted in FIG. 3 is programmed to follow, in accordance with one embodiment of the invention.

In the exemplary embodiments of the invention described above, the sense and drive circuits 304 generates a gating signal (see FIG. 4 and accompanying description) to quickly switch OFF the solid-state device 306 in the PD 300, upon detection of a fault. There are situations where a fault will naturally clear on its own. For example, a falling tree may momentarily cause a fault but then the fault may clear as the tree completes its fall to the ground. In these and other similar situations, it would be advantageous for the PD 300 to be able to quickly and automatically reset (i.e., switch back ON) on its own, without the need for any human intervention. To ensure that the fault has actually cleared before switching the solid-state device 306 back ON for an extended period of time, however, in one embodiment of the invention the PD's 300's microcontroller 302 is programmed to perform a "fault verification" method. FIG. 15 is a drawing showing the salient steps in the fault verification method 1500. The method 1500 begins immediately after the sense and drive circuit 304 has sent a gating disable to switch the solid-state device 306 OFF. Specifically, as soon as the gating disable signal is sent, at step 1502 in the method 1500 the microcontroller 302 waits for a brief period of time Δt (for example, Δt=100 μs). After Δt has expired, at step 1504 the microcontroller 302 then directs the solid-state device 306 to switch back ON. If at decision 1506 the fault is still present, the sense and drive circuit 304 will override the microcontroller's command and switch 1508 switch the solid-state device 306 back OFF. An electrician or line engineer will then be alerted at step to go and investigate the cause of the fault. On the other hand, if the fault has cleared on its own, at step 1510 the solid-state device 306 is allowed to remain ON and the system resumes normal operations.

The fault verification method 1500 just described can also be beneficially adapted to address lightning surges. Instead of employing the modified sense and drive circuit 1400 depicted in FIG. 14, which allows the solid-state device 306 in the PD 300 to continue operating through a lightning surge, the sense and drive circuit 304 depicted in FIG. 4 is used to quickly switch OFF the solid-state device 306 when a lightning surge occurs. A lightning surge will typically last for only 30 to 100 μs, so by switching the solid-state device 306 back ON, say after 100 μs (similar to as in the algorithm just described in reference to FIG. 15), the PD 300 is able to quickly and automatically reset and resume normal operation once the lightning surge has passed.

While various embodiments of the present invention have been described, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments but, instead, should be determined by the appended claims, including the full scope of equivalents to which such claims are entitled.

The invention claimed is:

1. A hybrid air-gap/solid-state circuit breaker, comprising:
    line-in and line-out terminals;
    a solid-state device configured between the line-in and line-out terminals;
    a control circuit configured to monitor a current flowing through the solid-state device and a connected load and switch the solid-state device OFF upon detecting a short circuit or overload of unacceptably long duration;
    an air-gap forming apparatus coupled in series with the solid-state device, between the line-in and line-out terminals; and
    a microcontroller configured to generate an air gap control signal that triggers the air-gap forming apparatus to form an air gap between the line-in and line-out terminals after the control circuit has detected a short circuit or overload of unacceptably long duration and switched the solid-state device OFF,
    wherein the air-gap forming apparatus comprises a solenoid configured to automatically trigger in response to the air gap control signal and force electrical contacts of the air-gap forming apparatus to open and form the air gap between the line-in and line-out terminals, and the hybrid air-gap/solid-state circuit breaker further comprises a mechanically-manipulated button or switch that is mechanically linked to the air-gap forming apparatus and that when pushed or manipulated by a human user causes the air-gap forming apparatus to form the air gap between the line-in and line-out terminals, purely by way of mechanical manipulation and without having to trigger the solenoid.

2. The hybrid air-gap/solid-state circuit breaker of claim 1, wherein the control circuit is separate and distinct from the microcontroller and consists entirely of hardware.

3. The hybrid air-gap/solid-state circuit breaker of claim 2, wherein the control circuit is operable to switch the solid-state device OFF in a few microseconds or less after detecting a short circuit.

4. The hybrid air-gap/solid-state circuit breaker of claim 1, wherein the microcontroller is operable to trigger the air-gap forming apparatus to form the air gap automatically upon the control circuit detecting a short circuit or overload of unacceptably long duration and the air gap is formed without any human interaction or human participation.

5. The hybrid air-gap/solid-state circuit breaker of claim 4, further comprising a button or switch that when pushed or manipulated by a human user causes the air-gap forming apparatus to form the air gap between the line-in and line-out terminals.

6. The hybrid air-gap/solid-state circuit breaker of claim 5, further comprising a displacement detecting device configured to detect when a human user begins to push or manipulate the button or switch and generate a movement detection electrical signal that is used to switch the solid-state device OFF before the button or switch has been fully pushed or manipulated by the human user and before the air-gap forming apparatus has formed the air gap between the line-in and line-out terminals.

7. The hybrid air-gap/solid-state circuit breaker of claim 1, wherein time-current characteristics of the hybrid air-gap/solid-state circuit breaker are determined by the solid-state device and are capable of being adjusted by the microcontroller after the hybrid air-gap/solid-state circuit breaker is configured for operation in an electrical distribution system.

8. The hybrid air-gap/solid-state circuit breaker of claim 1, wherein the hybrid air-gap/solid-state circuit breaker includes a communications and control (comm/control) bus interface that connects to a comm/control bus and allows the microcontroller in the hybrid air-gap/solid-state circuit breaker to communicate with another computing device also connected to the comm/control bus.

9. The hybrid air-gap/solid-state circuit breaker of claim 8, wherein time-current characteristics of the hybrid air-gap/solid-state circuit breaker are determined by the solid-state device and are user programmable.

10. The hybrid air-gap/solid-state circuit breaker of claim 9, wherein the time-current characteristics are capable of being adjusted by the microcontroller after the hybrid air-gap/solid-state circuit breaker is configured for operation in an electrical distribution system.

11. The hybrid air-gap/solid-state circuit breaker of claim 1, wherein the microcontroller is further configured to control a duty cycle of the solid-state device.

12. The hybrid air-gap/solid-state circuit breaker of claim 1, wherein the microcontroller is further configured to allow an inrush current to flow during an inrush event but to switch the solid-state device OFF or direct the control circuit to switch the solid-state device OFF if the solid-state device begins to operate outside a safe operating area during the inrush event.

13. The hybrid air-gap/solid-state circuit breaker of claim 1, wherein the control circuit is configured to switch the solid-state device OFF immediately upon detecting that the current flowing through the solid-state device and connected load exceeds an instant-trip threshold current $I_{MAX}$.

14. The hybrid air-gap/solid-state circuit breaker of claim 13, wherein the control circuit is further configured to switch the solid-state device OFF after detecting that the current flowing through the solid-state device and connected load has exceeded a long-time threshold current $I_{LT}$ and has persisted for a predetermined duration of time.

15. The hybrid air-gap/solid-state circuit breaker of claim 14, wherein the instant-trip threshold current $I_{MAX}$, long-time threshold current $I_{LT}$, and predetermined duration of time are set by the microcontroller and are user programmable.

16. The hybrid air-gap/solid-state circuit breaker of claim 14, wherein the instant-trip threshold current $I_{MAX}$, long-time threshold current $I_{LT}$, and predetermined duration of time are set by the microcontroller and adjustable by the microcontroller after the hybrid air-gap/solid-state circuit breaker is configured for operation in an electrical distribution system.

17. The hybrid air-gap/solid-state circuit breaker of claim 1, further comprising an electronic display.

18. The hybrid air-gap/solid-state circuit breaker of claim 17, wherein the electronic display is configured to display real-time operating information.

19. The hybrid air-gap/solid-state circuit breaker of claim 17, wherein information displayed by the electronic display further includes one or more of: a name for the hybrid air-gap/solid-state circuit breaker, a name for the load, and a name for a panelboard within which the hybrid air-gap/solid-state circuit breaker is installed.

20. The hybrid air-gap/solid-state circuit breaker of claim 17, wherein the electronic display comprises a display technology that allows the information being displayed to continue to be displayed even after electrical power to the electronic display is removed.

21. A hybrid air-gap/solid-state circuit breaker, comprising:
   means for sensing a load current flowing through a solid-state device and an air-gap forming apparatus connected in series with the solid-state device, between line-in and line-out terminals;
   means for setting an instant-trip threshold current $I_{MAX}$, a long-time threshold current $I_{LT}$, and a predetermined maximum duration of time corresponding to the long-time threshold current $I_{LT}$;
   first means for determining whether a sensed load current produced by the means for sensing exceeds the instant-trip threshold current $I_{MAX}$;
   second means for determining whether the sensed load current has exceeded the long-time threshold current $I_{LT}$ for longer than the predetermined maximum duration of time;
   means for switching the solid-state device OFF if the first means for determining determines that the sensed load current exceeds the instant-trip threshold current $I_{MAX}$ or the second means for determining determines that the sensed load current has exceeded the long-time threshold current $I_{LT}$ for longer than the predetermined maximum duration of time;
   means for triggering the air-gap forming apparatus to form an air gap between the line-in and line-out terminals after the means for switching the solid-state device OFF has switched the solid-state device OFF;
   means for allowing an inrush current to flow during an inrush event; and
   means for determining whether the solid-state device begins to operate outside a safe operating area during the inrush event,
   wherein the means for switching the solid-state device OFF is configured and controlled to switch the solid-state device OFF after the means for determining whether the solid-state device begins to operate outside a safe operating area determines that the solid-state device has begun operating outside the safe operating area.

22. The hybrid air-gap/solid-state circuit breaker of claim 21, wherein the means for switching the solid-state device OFF is operable to switch the solid-state device within a few microseconds after the first means for determining determines that the sensed load current has exceeded the instant-trip threshold current $I_{MAX}$.

23. The hybrid air-gap/solid-state circuit breaker of claim 21, wherein the first and second means for determining consist of a control circuit implemented in hardware and the means for triggering the air-gap forming apparatus comprises a microcontroller separate and distinct from the control circuit.

24. The hybrid air-gap/solid-state circuit breaker of claim 21, wherein the instant-trip threshold current $I_{MAX}$, long-time threshold current $I_{LT}$, and predetermined maximum duration of time are user programmable.

25. The hybrid air-gap/solid-state circuit breaker of claim 21, further comprising means for facilitating a soft start of an induction motor load.

26. The hybrid air-gap/solid-state circuit breaker of claim 21, further comprising means for manually forming an air gap between the line-in and line-out terminals.

27. The hybrid air-gap/solid-state circuit breaker of claim 21, further comprising display means for displaying real-time operating information.

28. The hybrid air-gap/solid-state circuit breaker of claim 27, wherein the display means is further configured to display one or more of: a name for the hybrid air-gap/solid-state circuit breaker, a name for the load, and a name for a panelboard within which the hybrid air-gap/solid-state circuit breaker is installed.

29. A hybrid air-gap/solid-state circuit breaker, comprising:
   line-in and line-out terminals;
   a solid-state device configured between the line-in and line-out terminals;
   a control circuit configured to monitor a current flowing through the solid-state device and a connected load and switch the solid-state device OFF upon detecting a short circuit or overload of unacceptably long duration;

an air-gap forming apparatus coupled in series with the solid-state device, between the line-in and line-out terminals;

a microcontroller configured to generate an air gap control signal that triggers the air-gap forming apparatus to automatically form an air gap between the line-in and line-out terminals, without any human interaction or human participation, after the control circuit has detected a short circuit or overload of unacceptably long duration and switched the solid-state device OFF;

a button or switch that when pushed or manipulated by a human user causes the air-gap forming apparatus to form an air gap between the line-in and line-out terminals; and a displacement detecting device configured to detect when the human user begins to push or manipulate the button or switch and generate a movement detection electrical signal that is used to switch the solid-state device OFF before the button or switch has been fully pushed or manipulated by the human user and before the air-gap forming apparatus has formed the air gap between the line-in and line-out terminals.

30. The hybrid air-gap/solid-state circuit breaker of claim 29, wherein the control circuit is separate and distinct from the microcontroller and consists entirely of hardware.

31. The hybrid air-gap/solid-state circuit breaker of claim 29, wherein the air-gap forming apparatus comprises a solenoid configured to automatically trigger in response to the air gap control signal and force electrical contacts of the air-gap forming apparatus to open and form the air gap between the line-in and line-out terminals, and the button or switch comprises a mechanically-manipulated button or switch that is mechanically linked to the air-gap forming apparatus and that when pushed or manipulated by the human user causes the air-gap forming apparatus to form the air gap between the line-in and line-out terminals, purely by way of mechanical manipulation and without having to trigger the solenoid.

32. The hybrid air-gap/solid-state circuit breaker of claim 29, wherein time-current characteristics of the hybrid air-gap/solid-state circuit breaker are determined by the solid-state device and are user programmable.

33. The hybrid air-gap/solid-state circuit breaker of claim 32, wherein the time-current characteristics are capable of being adjusted by the microcontroller after the hybrid air-gap/solid-state circuit breaker is configured for operation in an electrical distribution system.

34. The hybrid air-gap/solid-state circuit breaker of claim 29, wherein the microcontroller is further configured to control a duty cycle of the solid-state device.

35. The hybrid air-gap/solid-state circuit breaker of claim 29, wherein the microcontroller is further configured to allow an inrush current to flow during an inrush event but to switch the solid-state device OFF or direct the control circuit to switch the solid-state device OFF if the solid-state device begins to operate outside a safe operating area during the inrush event.

36. The hybrid air-gap/solid-state circuit breaker of claim 29, further comprising an electronic display with a display technology that allows information being displayed to continue to be displayed even after electrical power to the electronic display is removed.

37. The hybrid air-gap/solid-state circuit breaker of claim 36, wherein the electronic display is configured to display real-time operating information.

38. The hybrid air-gap/solid-state circuit breaker of claim 36, wherein information displayed by the electronic display further includes one or more of: a name for the hybrid air-gap/solid-state circuit breaker, a name for the load, and a name for a panelboard within which the hybrid air-gap/solid-state circuit breaker is installed.

39. A hybrid air-gap/solid-state circuit breaker, comprising:

line-in and line-out terminals;

a solid-state device configured between the line-in and line-out terminals;

a control circuit configured to monitor a current flowing through the solid-state device and a connected load and switch the solid-state device OFF upon detecting a short circuit or overload of unacceptably long duration;

an air-gap forming apparatus coupled in series with the solid-state device, between the line-in and line-out terminals; and a microcontroller configured to generate an air gap control signal that triggers the air-gap forming apparatus to form an air gap between the line-in and line-out terminals after the control circuit has detected a short circuit or overload of unacceptably long duration and switched the solid-state device OFF, and further configured to allow an inrush current to flow during an inrush event but to switch the solid-state device OFF or direct the control circuit to switch the solid-state device OFF if the solid-state device begins to operate outside a safe operating area during the inrush event.

40. The hybrid air-gap/solid-state circuit breaker of claim 39, wherein the control circuit is separate and distinct from the microcontroller and consists entirely of hardware.

41. The hybrid air-gap/solid-state circuit breaker of claim 39, wherein the microcontroller is operable to trigger the air-gap forming apparatus to form the air gap automatically upon the control circuit detecting a short circuit or overload of unacceptably long duration and the air gap is formed without any human interaction or human participation.

42. The hybrid air-gap/solid-state circuit breaker of claim 41, further comprising a button or switch that when pushed or manipulated by a human user causes the air-gap forming apparatus to form the air gap between the line-in and line-out terminals.

43. The hybrid air-gap/solid-state circuit breaker of claim 39, wherein the air-gap forming apparatus comprises a solenoid configured to automatically trigger in response to the air gap control signal and force electrical contacts of the air-gap forming apparatus to open and form the air gap between the line-in and line-out terminals, and the hybrid air-gap/solid-state circuit breaker further comprises a mechanically-manipulated button or switch that is mechanically linked to the air-gap forming apparatus and that when pushed or manipulated by a human user causes the air-gap forming apparatus to form the air gap between the line-in and line-out terminals, purely by way of mechanical manipulation and without having to trigger the solenoid.

44. The hybrid air-gap/solid-state circuit breaker of claim 42, further comprising a displacement detecting device configured to detect when a human user begins to push or manipulate the button or switch and generate a movement detection electrical signal that is used to switch the solid-state device OFF before the button or switch has been fully pushed or manipulated by the human user and before the air-gap forming apparatus has formed the air gap between the line-in and line-out terminals.

45. The hybrid air-gap/solid-state circuit breaker of claim 39, wherein the microcontroller is further configured to control a duty cycle of the solid-state device.

46. The hybrid air-gap/solid-state circuit breaker of claim 39, further comprising an electronic display with a display technology that allows information being displayed to continue to be displayed even after electrical power to the electronic display is removed.

47. The hybrid air-gap/solid-state circuit breaker of claim 46, wherein the electronic display is configured to display real-time operating information.

48. The hybrid air-gap/solid-state circuit breaker of claim 46, wherein the information displayed by the electronic display further comprises one or more of: a name for the hybrid air-gap/solid-state circuit breaker, a name for the load, and a name for a panelboard within which the hybrid air-gap/solid-state circuit breaker is installed.

* * * * *